(12) United States Patent
Guler et al.

(10) Patent No.: US 7,627,514 B2
(45) Date of Patent: Dec. 1, 2009

(54) METHOD AND SYSTEM FOR SELECTING AN OPTIMAL AUCTION FORMAT

(75) Inventors: Kemal Guler, Cupertino, CA (US);
Tongwei Liu, Redwood City, CA (US);
Hsiu-Khuern Tang, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1921 days.

(21) Appl. No.: 09/903,075

(22) Filed: Jul. 10, 2001

(65) Prior Publication Data

US 2003/0018562 A1   Jan. 23, 2003

(51) Int. Cl.
*G06Q 40/00* (2006.01)
(52) U.S. Cl. .............................. 705/37; 705/26; 705/80
(58) Field of Classification Search ................... 705/37, 705/26, 80
See application file for complete search history.

(56) References Cited

U.S. PATENT DOCUMENTS

| 5,818,914 | A * | 10/1998 | Fujisaki .................. 379/93.12 |
| 5,835,896 | A * | 11/1998 | Fisher et al. ................... 705/37 |
| 6,285,989 | B1 * | 9/2001 | Shoham ........................ 705/37 |
| 6,415,270 | B1 * | 7/2002 | Rackson et al. ........... 705/36 R |
| 6,871,190 | B1 * | 3/2005 | Seymour et al. ............... 705/37 |
| 2002/0174052 | A1 * | 11/2002 | Guler et al. ................... 705/37 |
| 2003/0014346 | A1 * | 1/2003 | Zhang ........................ 705/37 |

OTHER PUBLICATIONS

"The Simple Economics of Optimal Auctions," by Jeremy Bulow and John Roberts. The Journal of Political Economy, vol. 97, No. 5. (Oct. 1989), pp. 1060-1090.*
"Auction Format Matters: Evidence on Bidding Behavior and Seller Revenue," by Robert A. Feldman and Vincent Reinhart. International Monetary Fund. Staff Papers—International Monetary Fund; Jun. 1996; 43,2; ABI/INFORM Global. p. 395.*
"Auctions: Theory and Applications," by Robert A. Feldman and Rajnish Mehra. IMF Staff Papers. vol. 40, No. 3 (Sep. 1993).*
"A theoretical and empirical investigation of multi-item on-line auctions," by Ravi Bapna, Paulo Goes and Alok Gupta. Information Technology and Management; 2000; 1, 1-2; ABI/INFORM Global p. 1.*

* cited by examiner

*Primary Examiner*—Jagdish N Patel
*Assistant Examiner*—Sara Chandler

(57) ABSTRACT

An automated estimation and optimization solution for selecting the best auction format by determining the latent elements of the auction environment taking into account the strategic and information conditions with minimal assumptions on the distributions of unobserved random elements. Structural analysis of bid data from prior auctions is used to identify and estimate the distributions of bidders' private signals conditional on observable bidder characteristics. The estimated signal distributions, identified by the structural analysis, are used to evaluate alternative auction formats and to select the best format from among a given set of candidates. The present invention provides decision support tools to select an auction format based on structural econometric analysis of available data on the market environment. A decision-maker may estimate the unobservable private signals of the bidders and to determine the best auction format the decision maker can employ to sell a given set of items.

24 Claims, 18 Drawing Sheets

Historical Auction Data Repository contains data on past auctions. For the purposes of present invention, the following variables are observed for each auction in the database.

Auction:
    Auction ID
    Further Auction Characteristics
Auctioned Item:
    Item ID
    Name
    Quantity
    Description
    Further Item Characteristics
Mechanism:
    Auction Format
    Reserve price
    Further Mechanism Characteristics
Bidders:
    Bidder ID
    Segment ID
    Further Bidder Characteristics
Bids
    Identities of participating bidders
    Bids submitted by participating bidders
Outcomes:
    Assigned payments for each bidder
    Assigned quantities for each bidder

Figure 11a

AUCTION CHARACTERISTICS:
    Auction ID
    Item ID
    Item Name
    Quantity
    Dates:
        Announcement
        Start
        Close
    Seller/Buyer ID
    Auction Mechanism Characteristics
    Invited Bidders' IDs
    Participating Bidders' IDs and Bids, Quantities
    Outcome:
        Assigned Price for each bidder
        Assigned Quantities for each bidder
    Fees:
        Shipping & Handling
        Taxes
        Auctioneer Fees:
            Posting Fee
            Ad Valorem Fee

Figure 11b

BIDS:
- Bid ID
- Auction ID
- Item ID
- Bidder ID
- Bid Time Stamp
- Price Bid
- Bid Type
    - Proxy
    - Direct
- Quantity Desired
- Minimum Quantity
- Currency

Figure 11c

MECHANISM CHARACTERISTICS:
- Format
  - English
  - Dutch
  - Sealed Bid First Price
  - Sealed Bid Second Price
  - Vickrey
  - etc
- Buy/Sell
- Entry Rule
  - Open
    - Free
    - Fee
  - Invitation
    - Free
    - Fee
- Reserve Price
  - Secret
  - Open
- Start Price
- Bid Increment
  - Fixed
  - Relative
- Closing Rule
  - Inactivity Time
  - Fixed Closing Time <u>Figure 11d</u>

ITEM CHARACTERISTICS:
- Item ID
- Name
- Description
- Location
- SKU
- Manufacturer
- Model Number
- Condition
- Warranty
- Weight
- Weight Unit
- Measurement Unit
- Currency
- List Price
- Etc

Figure 11e

BIDDER CHARACTERISTICS:
    ID
    Segment ID
    Name
    Address
    General Information
    Socio Demographic Information
    Etc

Figure 11f

SELLER/BUYER CHARACTERISTICS:
    Seller/Buyer ID
    Name
    Address
    General Information
    Socio Demographic Information
    Etc

Figure 11g

METHOD AND SYSTEM FOR SELECTING AN OPTIMAL AUCTION FORMAT

FIELD OF INVENTION

The present invention relates to the field of auction design and analysis processes. Specifically, the present invention relates to an automated decision support method and system for selecting an optimal auction format.

BACKGROUND OF THE INVENTION

A seller (respectively, a buyer in a procurement auction) has to make a number of decisions to conduct an auction. For example, the seller chooses a format from among a number of alternative formats: English, Dutch, Vickrey, sealed-bid first-price, etc. Then the seller decides the levels of a number of parameters: reserve price, bid increment, entry fees, lot size, etc. For any choice of the levels of these additional parameters, alternative formats may yield different outcomes from the seller's (buyer's) point of view. For example, whether or not English format is better than a sealed-bid first-price format depends on the specifics of the auction situation characterized typically by the bidders' attitudes towards risk, the distribution of bidders' private information and other relevant random elements.

A seller (buyer) conducting an auction to sell (procure) an item or items can improve the auction outcome in his/her favor by selecting an auction format based on the characteristics of the bidders.

As is known, the outcome of an auction (e.g., who gets what, who pays how much) is determined by bidding behavior of bidders. Bidding behavior depends on a number of factors including the auction rules. Different auction rules induce different behavior on the part of the bidders. A bidder's behavior under a given collection of auction rules in turn is determined by the bidder's private information. The structure of the private information held by the bidders is thus a key factor in evaluating alternative auction rules. This fundamental element of the auction environment is not directly observable and has to be estimated from available data.

Currently, the decisions on the auction format are left entirely to the person conducting the auction. There is little systematic data analysis to guide these decisions. Given the multiplicity of items bought/sold through auctions, it is typically too costly to hire expert analysts to configure the auction procedures for each case. Furthermore, fixed auction format is rarely optimal for every case to which it is applied. Sellers (buyers) typically must resort to decisions based on personal feelings and instinct.

Consider the decision to choose between first-price and English auction. Currently auction format choice decision is guided by rules of thumb, and is error prone. Certain characteristics of the market environment affect the revenues from English and first price auctions. In some environments English auction is better from a seller's point of view, in some a first price auction is better. However, in many markets such characteristics, and hence the appropriate auction format, are seldom fixed, and thus an auction format which is fixed once-and-for-all is often the wrong format.

Currently, there is not an integrated data collection, modeling, estimation and optimization solution for selecting the auction format optimally based on structural econometric analysis of available data. All decisions must be based on personal knowledge rather than a systematic analysis. As a result, a determination of an optimal auction format is often guesswork and may not provide optimal results.

Accordingly, there exists a need for an automated estimation and optimization solution for selecting the best auction format. A need exists for a method and/or system that provides automated decision support for selecting the best auction format based on structural analysis of data from related auctions. A need also exists for a method and/or system that accomplishes the above needs, and determines the latent elements of the auction environment taking into account the strategic and information conditions with minimal assumptions on the distributions of unobserved random elements.

SUMMARY OF THE INVENTION

An embodiment of the present invention provides an automated estimation and optimization solution for selecting the best auction format. An embodiment of the present invention provides a method and system that provides automated decision support for selecting the best auction format based on structural analysis of data from related auctions. An embodiment of the present invention provides a method and system that determines the latent elements of the auction environment taking into account the strategic and information conditions with minimal assumptions on the distributions of unobserved random elements.

An embodiment of the present invention provides a method and system that enables (1) a buyer conducting an auction to procure an item(s), or (2) a seller conducting an auction to sell an item(s) to identify and estimate empirically the unknown elements of the market structure and to factor this information into his decisions regarding the appropriate format to implement in the auction to be conducted.

In one embodiment of the present invention, structural analysis of bid data from prior auctions is used to identify and estimate the distributions of bidders' private signals conditional on observable bidder characteristics. In one embodiment, the estimated signal distributions, identified by the structural analysis, are used to evaluate alternative auction formats and to select the best format from among a given set of candidates.

In one embodiment, the present invention provides decision support tools to select an auction format based on structural econometric analysis of available data on the market environment. The present invention allows a decision-maker to estimate the unobservable private signals of the bidders and to determine the best auction format the decision maker can employ to sell a given set of items.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 11a-g depict the contents of an exemplary database of market data, in accordance with one embodiment of the invention.

DETAILED DESCRIPTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical, electronic, magnetic, optical, and/or electro-optical signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "calculating" or "constraining" or "estimating" or "evaluating" or "expressing" or "inputting" or "outputting" or "predicting" or "ranking" or "receiving" or "retrieving" or "selecting" or "substituting" or "transforming" or "promulgating" or the like, refer to the action and processes of a computer system, or similar electronic computing device, that manipulates and transforms data represented as physical (electronic) quantities within the communications and computer systems' registers and memories into other data similarly represented as physical quantities within the computer system memories or registers or other such information storage, transmission, or display devices.

Figure 4:
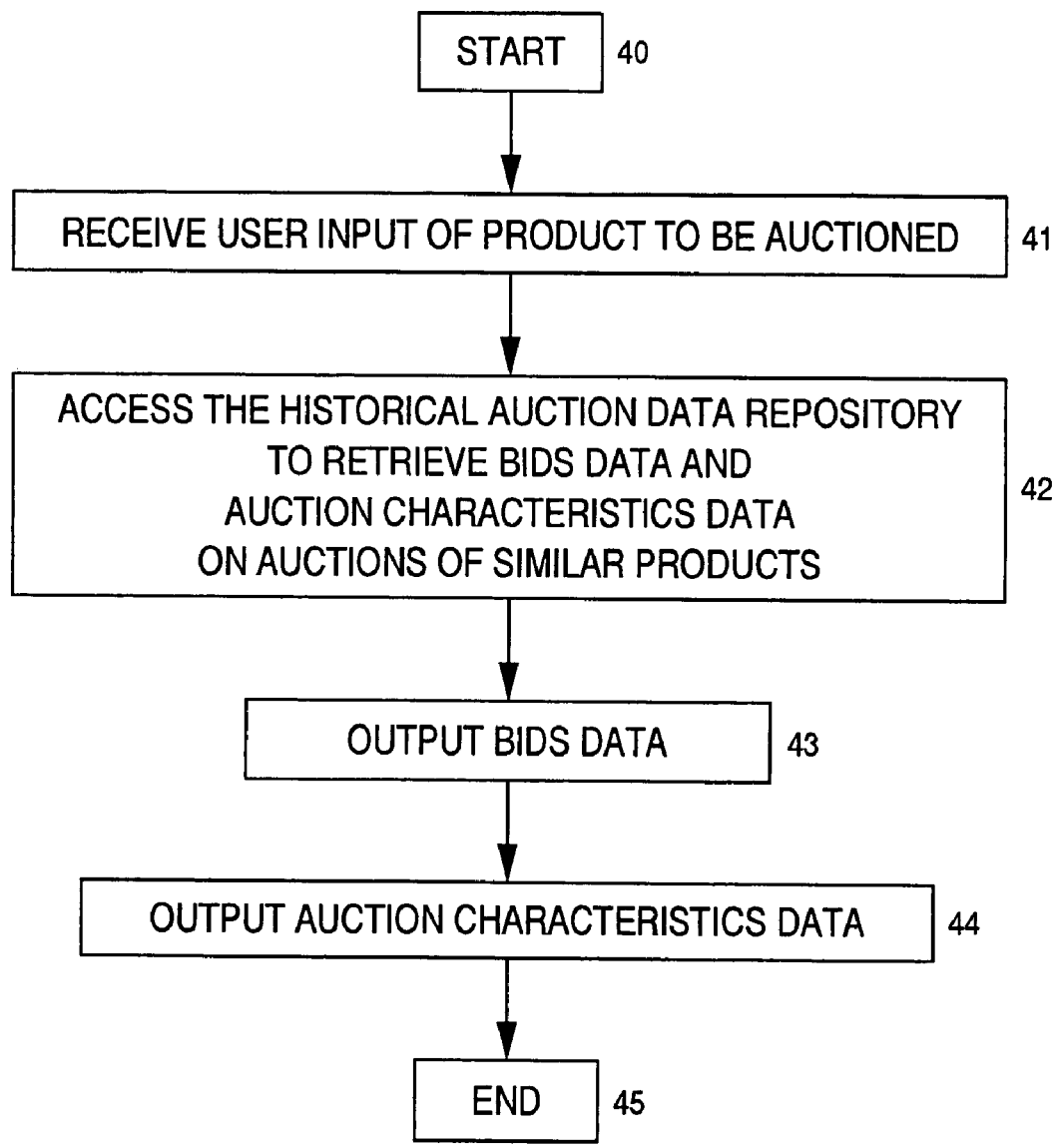
FIG. 4 is a flow chart of the steps in a process for generating market characteristics data, in accordance with one embodiment of the invention.

Certain portions of the detailed descriptions of the invention, which follow, are presented in terms of processes (e.g., process 40 of FIG. 4). These processes are, in one embodiment, carried out by processors and electrical and electronic components under the control of computer readable and computer executable instructions. The computer readable and computer executable instructions reside, for example, in registers and other features of processors, memories, and data storage features of computers executing programs and processes. However, the computer readable and computer executable instructions may reside in any type of computer readable medium. Although specific steps are disclosed in figures herein describing the operations of processes (e.g., FIG. 4 describing process 40), such steps are exemplary. That is, the present invention is well suited to performing various other steps or variations of the steps recited in the flowcharts of the figures herein. Further, it is appreciated that the steps of these processes may be performed by software or hardware or any combination of software and hardware.

The present invention is discussed primarily in the context of a method for determining an optimal auction format for a market structure, such as an auction, with respect to a multiplicity of possible market participants, such as auction participants like sellers and bidders, or other end users specify. In the following discussion, a market analysis system, especially applicable to auctions will first be discussed in a general context, after which, specific explanations will be made to applying the system to selecting optimal auction formats.

Exemplary System

Exemplary Automated Decision Support System in General

Figure 1:
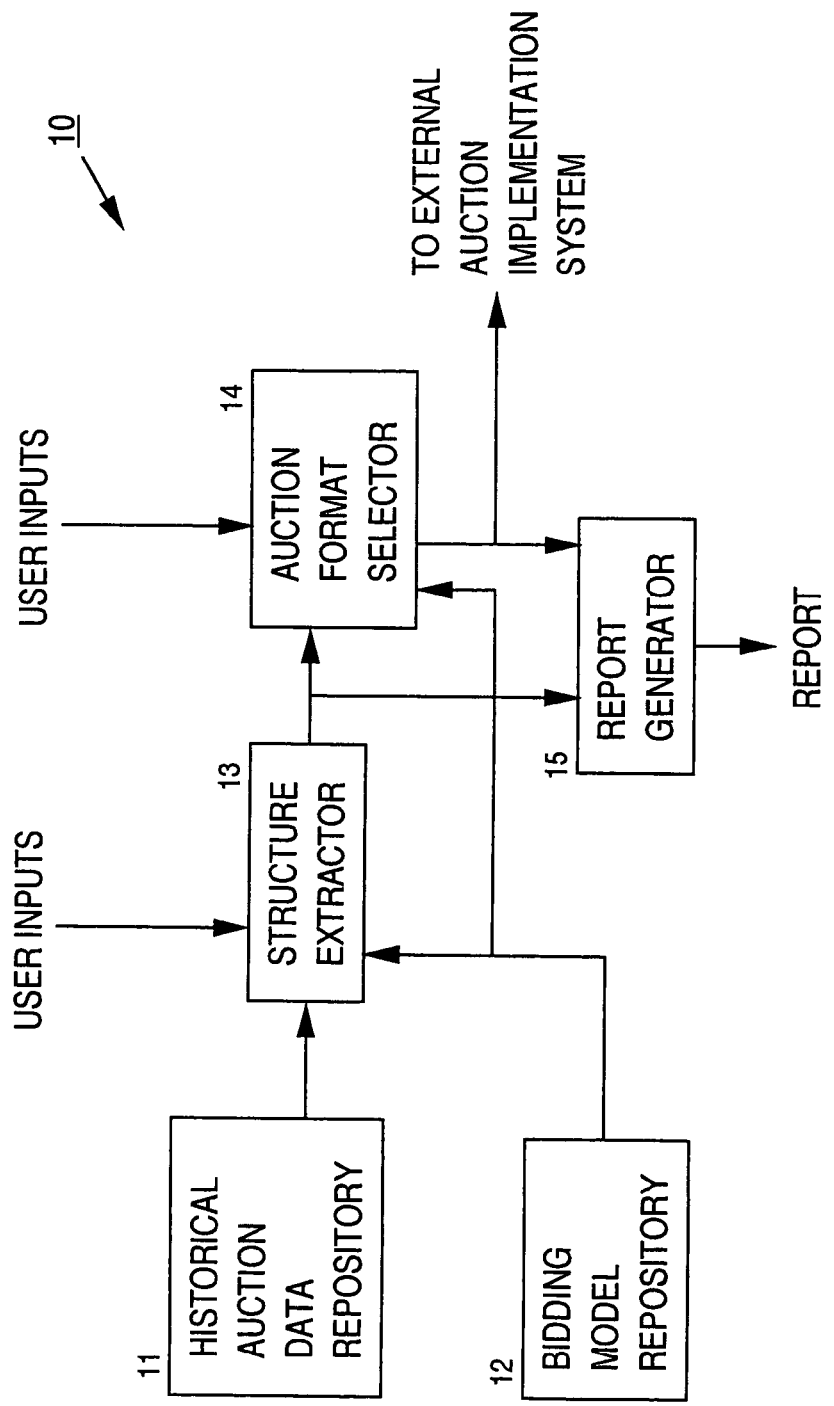
FIG. 1 schematically shows an automated decision support system for designing auctions, in accordance with one embodiment of the invention.

FIG. 1 shows an automated decision support system 10 for designing auctions in accordance with one embodiment of the present invention. In one embodiment, the automated decision support system 10 is a software system implemented in a computer system. Alternatively, the automated decision support system 10 can be implemented by hardware or firmware.

The computer system that embodies the automated decision support system 10 can be any kind of computer system. For example, the computer system can be a main-frame computer system, a super computer system, a workstation computer system, a server computer system, or a personal computer system.

The automatic decision support system 10 is used to provide decision support for auction design. This means that the automatic decision support system 10 aids auction sellers, buyers, bidders, or auction houses in making auction-related decisions. As described above, there are typically a number decisions to be made regarding an auction. For example, in an auction run by a seller, a bidder has to decide on (1) how to bid and (2) whether or not to bid in a specific auction conditional on information the bidder has. In addition, the bidder needs to decide whether or not and how to gather information on auctions, objects, rivals. The auction house for the auction needs to decide fees for buyers and/or sellers. In addition, the auction house needs to decide the menu of auction mechanism to offer.

Similarly, in an auction run by a seller, the seller also has to decide what the reserve price of the auctioned item should be, what is the best auction format, what entry fees should be charged for participating in the auction, what timing and, duration of the auction should be, the quantity of the item to be auctioned, what participation rules should govern the auction, and what information rules should be imposed to the auction, etc. As is known, these decisions affect the revenue or profit generated from the auction.

In order to achieve the maximum revenue or profit, these decisions must be optimized. In accordance with one embodiment of the present invention, this optimization is done by the automatic decision support system 10. The automatic decision support system 10 provides optimal configuration of auction design parameters and comparative evaluation of any pair of design choices. In other words, the automatic decision support system 10 provides automated auction analysis optimization.

In accordance with one embodiment of the present invention, the automatic decision support system 10 processes available data using structural econometric techniques to identify the latent distribution of random or unknown elements of the market structure or market environment of a particular auction. In addition, the automatic decision support system 10 provides the optimal values of any subset of the decision variables or candidates based on an evaluation criterion specified by the user of the system 10 conditional on the levels of the remaining decisions.

The available data to the automatic decision support system 10 include data supplied by the user of the system 10. The data include description of the item to be auctioned, auction decision candidates, constraints, and auction evaluation criterion. These are user inputs to the automatic decision support system 10. The available data also include historical auction data and bidding model data. The historical auction data and the bidding model data are stored in the automatic decision support system 10.

The automatic decision support system 10 receives the user inputs of the description of the item to be auctioned, the auction decision candidates, the constraints, and the auction evaluation criterion. The automatic decision support system 10 then selects the best auction decision candidates (e.g., the best auction format is English, the reserve price is $100, the entry fee is $5, and the duration is five days) among the inputted auction decision candidates based on the auction evaluation criterion and the estimated market structure of the auction.

As is known, bidding behavior determines the outcome of an auction. The outcome of an auction means who gets what and who pays how much, etc. Different auction rules induce different bidding behavior on the part of bidders. A bidder's behavior under a given set of auction rules in turn is determined by his private information. The structure of private information held by bidders is thus a key factor in evaluating alternative auction procedures (e.g., auction format, reserve prices, entry fees, timing and duration of the auction, quantity, participation rules, and information rules, etc.) from the point of view of a seller (or buyer) trying to sell (or procure) an item by auctioning. This fundamental element of an auction environment is not directly observable and has to be estimated from observable and available data. The auction procedures can also be referred to as auction mechanisms. They include the characteristics of the auction.

In accordance with one embodiment of the present invention, the automatic decision support system 10 estimates the unknown or unobservable elements of the market structure of the auction by extracting the joint distribution of private information of the bidders (e.g., the probability distribution of bidders' willingness to pay, the probability distribution of the number of potential bidders) from bid data extracted from the historical auction data of similar auctions. In particular, the automatic decision support system 10 estimates the unknown elements of the market structure by (1) expressing unobservable variables in the bidding model in terms of the observable bid data, and (2) applying known statistical density estimation techniques to the expression so as to obtain an estimation of the unknown elements. In doing so, the automatic decision support system 10 enables the user (either a seller or a buyer) of the system 10 to factor the distribution of bidders' private information into his or her decisions regarding the appropriate auction procedure to conduct the auction.

With the estimated unknown elements of the market structure and other user inputs (e.g., the auction design candidates, evaluation criterion), the automatic decision support system 10 provides optimized auction design candidates based on the evaluation criterion provided such that maximized expected revenue or profit from the auction can be achieved. This means that the automatic decision support system 10 can be used to configure optimized auction parameters for a multiplicity of performance criteria. The structure and operation of the automatic decision support system 10 will be described in more detail below, also in conjunction with FIGS. 1 through 10.

As can be seen from FIG. 1, the automatic decision support system 10 includes a historical auction data repository 11, a bidding model repository 12, a structure extractor 13, a behavior predictor 14, and an optimizer 15. The historical auction data repository 11 stores the historical auction data for, previous auctions. The historical auction data specify auction characteristics and/or mechanisms of previous auctions. This means that the historical auction data include the bid data and the auction characteristics data of each of the stored previous auctions. The auction characteristics data specify the auction procedure of the auction. Thus, the auction characteristics data of an auction describe the reserve price of the auctioned item, the auction format, the number of bidders, etc. of the particular auction. The bid data of an auction describe the bidding behaviors of bidders in the auction. The bid data is a record that typically contains the auction identifier, number of bidders N, number of bids, transaction price, winner, reserve price, auction format, item characteristics, bidder characteristics. Both the bid data and the auction characteristics data are extracted from the auction data of the previous or historical auctions for various items. The historical auction data repository 11 can be implemented using any known database technology.

The bidding model repository 12 stores various bidding models. A bidding model specifies a bidding behavior pattern. It is a function of auction characteristics or procedure of the corresponding auction. It is also a function of the market structure of the auction. For example, a Dutch auction bidding model specifies bidding behavior in a Dutch format auction. An English auction bidding model specifies bidding behavior in an English format auction. A first-price-sealed-bid auction bidding model specifies bidding behavior in a first-price-sealed-bid auction. The bidding model repository 12 can be implemented using any known database technology. Several examples of bidding models are provided in detail below.

The structure extractor 13 is used to estimate the unknown elements of the market structure of the auction. The structure extractor 13 first receives the user input of the item (and its characteristics) to be auctioned. The structure extractor 13 then accesses the repository 11 for the bid data and auction characteristics data observed in previous or historical auctions of similar items of the item. The structure extractor 13 is connected to the historical auction data repository 11 and the bidding model repository 12. The structure extractor 13 then produces a non-parametric structural estimate of the unobservable latent structure of the environment of the auction. The structure extractor 13 uses auction theory and non-parametric statistical methods to extract an estimate of the latent structure from the previously observed bids.

Exemplary System Applied to Selecting an Optimal Auction Format

With reference still to FIG. 1, automated decision support system 10 effectuates determining an optimal auction format in accordance with one embodiment of the present invention. In one embodiment of the present invention, the automated decision support system 10 analyzes available data using structural econometric techniques, as discussed above, to estimate the unknown distribution of private information held by bidders. In addition, the system of the present embodiment provides the optimal values of the decision variables based on an evaluation criterion specified by the user of the system. System 10, as effectuated by the present embodiment, has three major functional components in determining an optimal auction format. The first is structural modeling and estimation module 13. The second is a auction format selector module 14, and the third is a report generation module 15. In an alternative embodiment, another combination of components with functions duplicative of the forgoing may effectuate this functionality.

Structural Modeling and Estimation

The first functionally active component of the automated decision support system 10 (FIG. 1) of one embodiment, structure extractor 13 effectuates the estimation of the distributions of private signals of bidders from bid data in prior auctions allows for possible asymmetries across identifiable bidder groups to be recognized.

Auction Format Selection

Referring still to FIG. 1, auction format selection module 14 selects the best auction format from a list of candidate formats under consideration. Auction format selection is performed for a wide variety of user specified evaluation criteria. In the case of a buyer running auctions to procure an item(s), this collection of criteria includes, but is not limited to, the buyer's short-term expected procurement cost, system efficiency, long-term expected procurement cost, and joint expected payoff of the buyer and a subset of bidders, etc. In the case of a seller running auctions to sell an item(s) the evaluation criterion may be the seller's expected profit, system efficiency, or the joint expected payoff of the seller and a subset of bidders.

The end-user inputs a specific performance criterion to be optimized by possibly combining these elements. The end-user is also allowed to specify a collection of constraints. The end-user inputs the constraints on the auction mechanisms to be evaluated. For example, the end-user may restrict the reserve price to a given level and may wish to choose between English and sealed-bid-first-price auction formats.

Report Generation

Again referring to FIG. 1, the expected performance level associated with the best auction format and alternative formats as well as expected variation in the performance level are reported by a report generator 15.

System 10 maintains, in one embodiment, two data repositories. As depicted in FIG. 1, these include a repository 11 of historical auction data for a multiplicity of goods and services, and a repository 12 of bidding models for a multiplicity of auction mechanisms and a multiplicity of market environments. For selecting an optimal auction format, in the present embodiment, system 10 uses data from both historical auction data repository 11 and bidding model repository 12 as inputs.

Historical auction data repository 11 contains data on past auctions. Historical auction data repository can be implemented using any known database technology. For the purposes of illustrating the principles of one embodiment of the present invention, each record in the database is assumed to contain the variables listed in Table A, below.

TABLE A

| Auction: |
| --- |
| Auction ID |
| Auctioned Item: |
| Item ID |
| Name |
| Quantity |
| Description |
| Mechanism: |
| Auction Format |
| Reserve price |
| Bidders: |
| Bidder ID |
| Segment ID |
| Bids: |
| Identities of participating bidders |
| Bids submitted by participating bidders |
| Outcomes: |
| Assigned payments for each bidder |
| Assigned quantities for each bidder |

For each bidder, the database contains a segment identity (ID). Alternatively, in another embodiment, further data on bidder-specific covariates that can be used for classifying the bidders and assigning segment identifiers. Some examples are E-bay rating, consumer individual flexibility rating, credit worthiness, income, occupation, or residential locale, and other special individualized ratings.

Bidding model repository 12 stores a variety of bidding models. The bidding model repository can also be implemented using any known database technology.

A bidding model specifies bidding behavior as a function of information held by a bidder and the characteristics of the market structure. The market structure can be decomposed into two parts: characteristics of the auction mechanism and characteristics of the environment. These terms are explained in detail as follows.

Part of the information held by a bidder is inherently private, that is, is known only by the bidder himself/herself and not observed by other participants. For example, a bidder's willingness to pay for the auctioned item is known only by the bidder himself/herself. Another example of private information is that, in a procurement auction for a project, each bidder typically has private information about the cost he/she would incur to deliver the project if he/she wins the auction. From the point of view of other participants, the private information of bidder "i" is a random variable with some probability distribution.

"Market structure" is intended to mean a collection of variables that describe the factors that may affect the bidding behavior of bidders. A market structure is characterized by two sets of variables: a first set of variables collectively describes the auction "environment," and a second set of variables collectively describes the auction "mechanism."

The first set of variables provides a description of the auction "environment." These variables include the number and other characteristics of bidders, the number and other characteristics of the auctioned item(s). For the purposes of illustrating the principles of this invention, we will take the number of items auctioned to be one.

In an auction with k groups of bidders with $n_i$ bidders in group i where i=1, . . . , k, let $F_i$ (v) denote the cumulative distribution of private signal of a representative bidder in group i. Here v denotes a bidder's private signal (typically interpreted as bidder i's willingness to pay for the item e.g., bidder j's valuation of the item). The interval $(a_i, z_i)$ denotes the range of possible values for this random variable for bidder group i.

For the purposes of illustrating the principles of this invention, the auction "environment" can be denoted by a list such as: $[k, (n_1, F_1, (a_1, z_1)), (n_2, F_2, (a_2, z_2)), (n_3, F_3, (a_3, z_3)), \ldots, (n_k, F_k, (a_k, z_k))]$. This list describes the number of bidder groups and the number of bidders and signal distribution of a typical bidder in each group.

The key challenge faced by the end-user of the system is that at least some elements of the market structure that describe the auction environment, namely, the distributions of bidders valuations are unobservable. Such unobservable elements are latent, and must be estimated from observable bid data on past auctions of similar items. Again, for the purposes of illustrating the principles of this invention, the number of bidder groups (k) and the number of bidders in each group ($n_1$, . . . , $n_k$) are observable, and the distributions of bidders are unobservable. The unobserved elements of the environment are its latent structure.

A second set of variables collectively provides a description of the characteristics of the market mechanism in use. These variables include auction format (e.g., English, Dutch, Vickrey, Sealed-Bid First-Price, etc.), reserve price (e.g., the lowest acceptable bid in an auction for selling an item; the highest acceptable bid in an auction for procuring an item), starting price, entry rule, bid increment rule, closing rule etc.

Representing Market Mechanism Attributes Using Lists

As is well known, holding everything else fixed, any variation in any of the dimensions of the auction mechanism can, in principle, result in variations in the submitted bids. For the purposes of illustrating the principles of this invention, mechanism characteristics can be represented by a list.

In a first example, the list:

(Format=Dutch, Reserve Price=$100 per item, Entry
Rule={By Invitation, Free}, Start Price=$500,
Bid Increment=–$1/second, Closing Rule=n/a)

describes a Dutch auction in which the bidders are the ones invited to participate in the auction, the price starts at $500 and is reduced at a rate of $1 per second until a bidder claims the item at the current price. If the price reaches $100 without any bidder claiming the item, the auction ends with no sale.

In a second example, the list:

(Format=Vickrey, Reserve Price=0, Entry Rule={By
Invitation, Free}, Start Price=n/a, Bid
Increment=n/a, Closing Rule=n/a)

describes a standard Vickrey auction with a reserve price of 0. A Vickrey auction is a sealed bid auction in which the highest bidder wins the auctioned item, and pays the second highest bid or the reserve price whichever is higher.

In a third example, the list:

(Format=Sealed Bid First Price, Reserve Price=$150
per item, Start Price=n/a, Entry Rule={Open,
Fee=$5}, Closing Rule=n/a)

describes a standard sealed-bid first-price auction in which anyone who pays $5 entry fee (and otherwise qualify) can submit a bid, which is required to be no less than $150, anytime during a specific time period. At the end of the specified period, the bidder who submitted the highest bid wins the item and pays what he bid. In this example all bidders are treated symmetrically.

Representative Bidding Models

A bidding model for an n bidder auction with a given mechanism characteristics and a given environment specifies n bid functions, $(\beta_1, \beta_2, \ldots, \beta_n)$, one for each bidder. A bidder's bid function is a relation between the private signal of the bidder and the bid he/she submits. Some examples are as follows, wherein V denotes a dummy variable indicating the private valuation of a bidder, and $\beta_j$ (V, mechanism characteristics, environment) denotes a bid function of bidder j.

In a first example, a Vickrey auction for the sale of an item is illustrated by the following exemplary bidding model:

$\beta_j$ (V, {Format=Vickrey, Reserve Price=R}, [2, ($n_1$, $F_1$, ($a_1$, $b_1$)), ($n_2$, $F_2$, ($a_2$, $b_2$))])=V for all bidders j.

In this example, regardless of the environment, each bidder submits a bid equal to his private valuation.

In a second example, an English auction for the sale of an item is illustrated by the following exemplary bidding model:

$\beta_j$ (V, {Format=English, Reserve Price=R}, [2, ($n_1$, $F_1$, ($a_1$, $z_1$)), ($n_2$, $F_2$, ($a_2$, $z_2$))])=V for all bidders j.

In this example, regardless of the environment, each bidder submits a bid equal to his private valuation.

In a third example, a sealed-bid first-price auction for the sale of an item is illustrated by the following exemplary bidding model:

$\beta_j$ (V, {Format=Sealed Bid First Price, Reserve
Price=R, Bid Comparison Rule=$\{T_1(B), T_2(B)\}$,
[2, ($n_1$, $F_1$, ($a_1$, $z_1$)), ($n_2$, $F_2$, ($a_2$, $z_2$))])=$\phi_k$ (V) if j
is in bidder group k (k=1,2).

The pair of functions $(\phi_1(V), \phi_2(V))$ is obtained by solving a system of differential equations for the unknown functions $\phi_1$ (b) and $\phi_2$ (b) and then inverting these functions to get the bid functions $$\phi_1(V)=\phi_1^{-1}(V)$$

and $$\phi_2(V)=\phi_2^{-1}(V).$$

The following system of differential equations in the unknown functions $\phi_1$ (b) and $\phi_2$ (b) with the initial conditions $\phi_1$ (R)=$\phi_2$ (R)=R can be solved by using any of known numerical procedures:

$$F_1(\phi_1(b))F_2(\phi_2(b))=[\phi_1(b)-b]\{(n_1-1)F_2(\phi_2(b))F_1'(\phi_1(b))\phi_1'(b)+n_2F_1(\phi_1(b))F_2'(\phi_2(b))\phi_2'(b)\} \quad \text{(Eq. 1)}$$

$$F_2(\phi_2(b))F_1(\phi_1(b))=[\phi_2(b)-b]\{(n_2-1)F_1(\phi_1(b))F_2'(\phi_2(b))\phi_2'(b)+n_1F_2(\phi_2(b))F_1'(\phi_1(b))\phi_1'(b)\}. \quad \text{(Eq. 2)}$$

In a fourth example illustrates that a bidding model for Dutch auction is the same as the bidding model in the third example directly above.

A fifth example illustrates a bidding model for sealed-bid first-price auction for the purchase of an item. In the case of auctions conducted by a buyer to purchase an item the notation V refers to the privately known cost of bidders. In a sealed-bid first-price auction for the purchase of an item the lowest bidder wins the auction and receives what he bid as payment. The bidding model for this case is as follows:

$$\beta_j (V, \{Format=Sealed\ Bid\ First\ Price,\ Reserve\ Price=R\}, /2, (n_1, F_1, (a_1, z_1)), (n_2, F_2, (a_2, z_2))]) = \phi_k (V)\ if\ j\ is\ in\ bidder\ group\ k\ (k=1,2).$$

The pair of functions $(\phi_1 (V), \phi_2 (V))$ is obtained by solving a system of differential equations for the unknown functions $\phi_1(b)$ and $\phi_2(b)$ and then inverting these functions to get the bid functions $\phi_1 (V) = \phi_1^{-1} (V)$ and $\phi_2 (V) = \phi_2^{-1} (V)$. The following system of differential equations in the unknown functions $\phi_1 (b)$ and $\phi_2 (b)$ with the initial conditions $\phi_1 (R) = \phi_2 (R) = R$ can be solved by using any of known numerical procedures:

$$[1-F_1(\phi_1(b))][1-F_2(\phi_2(b))] = [b-\phi_1(b)]\{(n_1-1)[1-F_2(\phi_2(b))]F_1'(\phi_1(b))\phi_1'(b) + n_2[1-F_1(\phi_1(b))]F_2'(\phi_2(b))\phi_2'(\pi(b))\} \quad (Eq.\ 1')$$

$$[1-F_2(\phi_2(b))][1-F_1(\phi_1(b))] = [b-\phi_2(b)]\{(n_2-1)[1-F_1(\phi_1(b))]F_2'(\phi_2(b))\phi_2'(b) + n_1[1-F_2(\phi_2(b))]F_1'(\phi_1(b))\phi_1'(b)\}. \quad (Eq.\ 2')$$

Furthermore, in one embodiment, the system uses input data supplied by the user of the system. This data includes, for example:

a set of item(s) to be auctioned (Example: {A Brand New 19 inch Ultra VGA HP Monitor, A Refurbished HP Kayak Desktop Computer with Intel Pentium III 850 Mhz, 128M RAM, 40G hard disk}.)

a set of valuations, one for each of the item(s) in a above representing the dollar value the seller gets if the item is not sold in this auction. (Example: {$200 for the monitor, $800 for the computer})

a set of constraints on the auction parameters (Examples: {Reserve Price=$300,} for the monitor, and {Reserve Price=$900} for the computer a set of alternative auction formats to be evaluated (Example: For the case of two items, e.g., a monitor and computer, to be sold, the seller may wish to evaluate the following alternative combinations of two auction format choices, e.g., Dutch and Vickrey auction formats for selling the two items. The seller may choose Dutch auction format for both items, Vickrey format for both items, Dutch format for the monitor and Vickrey for the computer, or Vickrey for the monitor and Dutch for the computer. For example, the end user may specify the alternative auction formats as (Auction_Format_For_Monitor, Auction_Format_For_Computer)={(Dutch, Dutch), (Vickrey, Vickrey)} in which case both items are to be auctioned under a single format, Dutch or Vickrey, which is to be determined by the system.

an evaluation criterion for ranking alternative auction formats (Example 1: Expected profit of the seller. Example 2: A weighted average of expected profit of the seller and expected profits of the bidders.)

Exemplary Processes

FIGS. 4-9 and FIG. 12 are flowcharts illustrating processes 40, 50, 60, 70, 80, 90 and 120, respectively, of steps performed in accordance with one embodiment of the present invention for determining an optimum auction format for an auction. FIGS. 4-9 and FIG. 12 illustrate processes of the present invention which, in one embodiment, are carried out by processors and electrical and electronic components under the control of computer readable and computer executable instructions. The computer readable and computer executable instructions reside, for example, in data storage features such as computer usable memory 1010 and/or processor 1050, and/or storage unit 1015 of computer system 1000 of FIG. 10. However, the computer readable and computer executable instructions may reside in any type of computer readable medium. Although specific steps are disclosed in flowcharts 40-90, such steps are exemplary. That is, the present invention is well suited to performing various other steps or variations of the steps recited in FIGS. 4-9. Within the present embodiment, it should be appreciated that the steps of flowcharts 40-90 may be performed by software, firmware, or hardware or any combination thereof.

With reference again to FIG. 1, the system includes a Historical Auction Data Repository 11, a Bidding Model Repository 12, a Structure Extractor Module 13, a Auction Format Selector Module 14, and a Report Generator Module 15.

Figure 2:
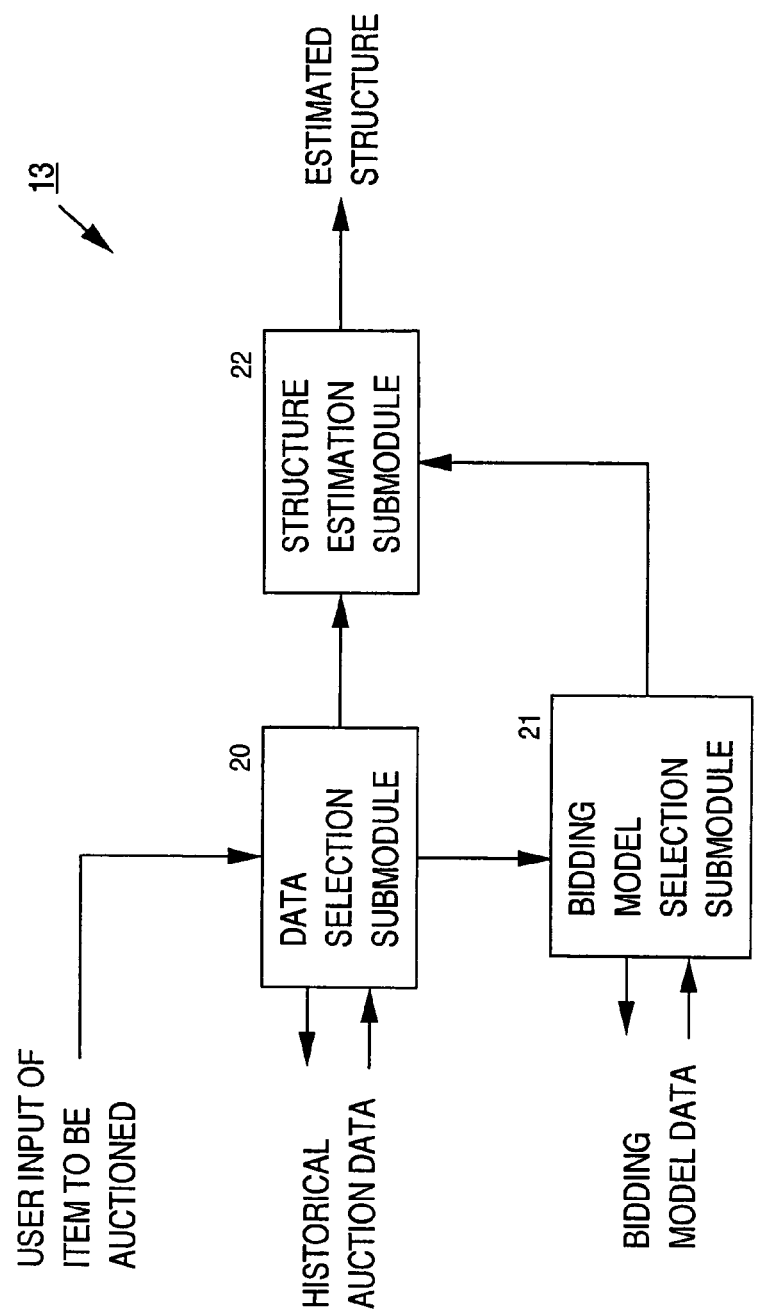
FIG. 2 shows in block diagram form the structure of the structure extractor of the decision support system of FIG. 1, in accordance with one embodiment of the invention.

With reference to FIG. 2, Structure Extractor Module 13 has three submodules, a Data Selection Submodule 20, a Bidding Model Selection Submodule 21, and Structure Estimation Submodule 22.

Figure 3:
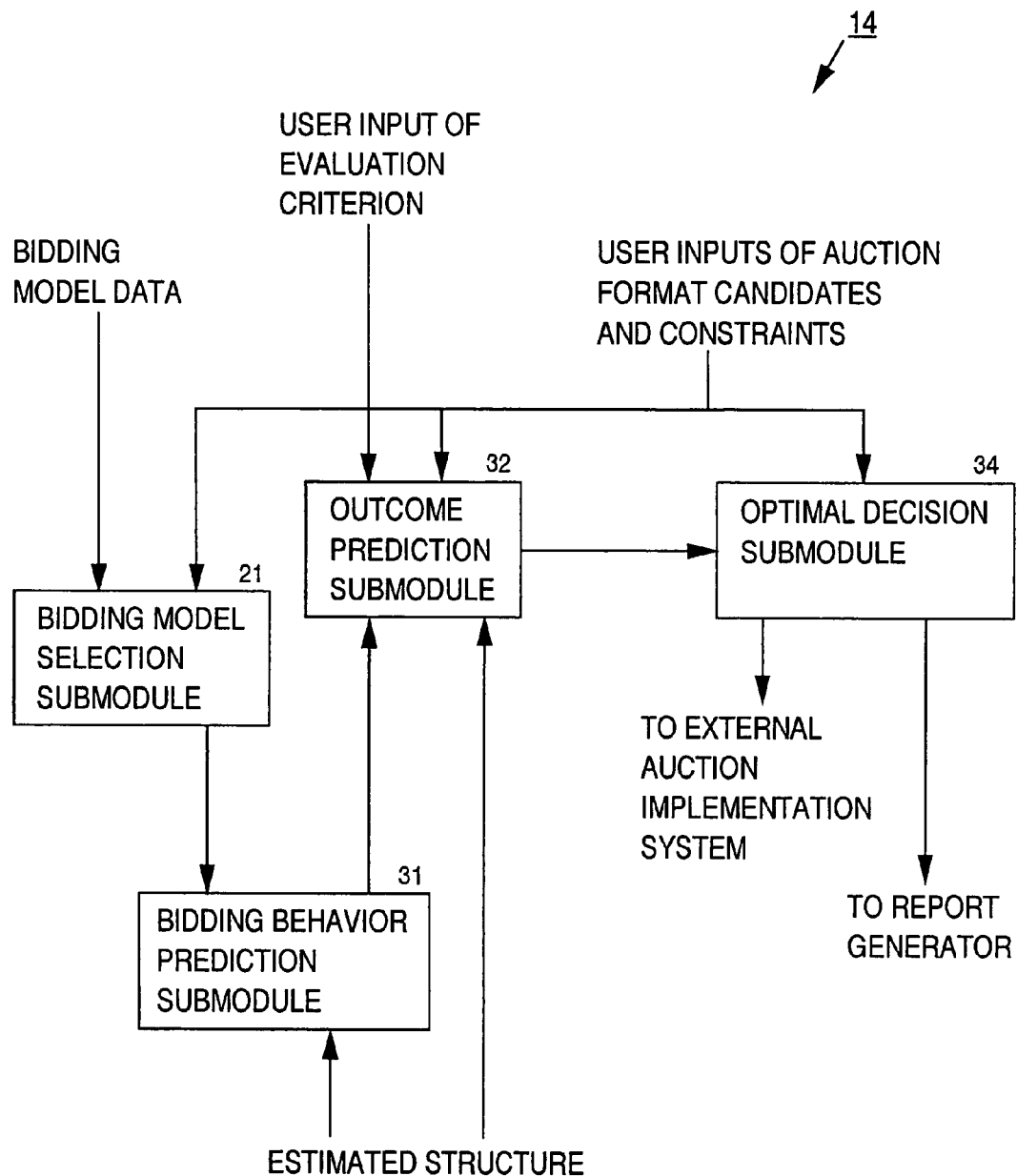
FIG. 3 shows in block diagram form the structure of the auction format selector of FIG. 1, in accordance with one embodiment of the invention.

With reference to FIG. 3, the Auction Format Selector Module also has three submodules: a Bidding Behavior Prediction Submodule 31, which receives an input from a Bidding Model Selection Submodule 30, an Outcome Prediction Submodule 32, and an Optimal Decision Submodule 34.

Structure Extractor Module 13 estimates the unobserved structural elements of the market structure. Structure Extractor 13 is connected to the Historical Auction Data Repository 11 and the Bidding Model Repository 12. Structure extractor module 13 has three submodules, a Data Selection Submodule 20, a Bidding Model Selection Submodule 21, and a Structure Estimation Submodule 22.

Figure 12:
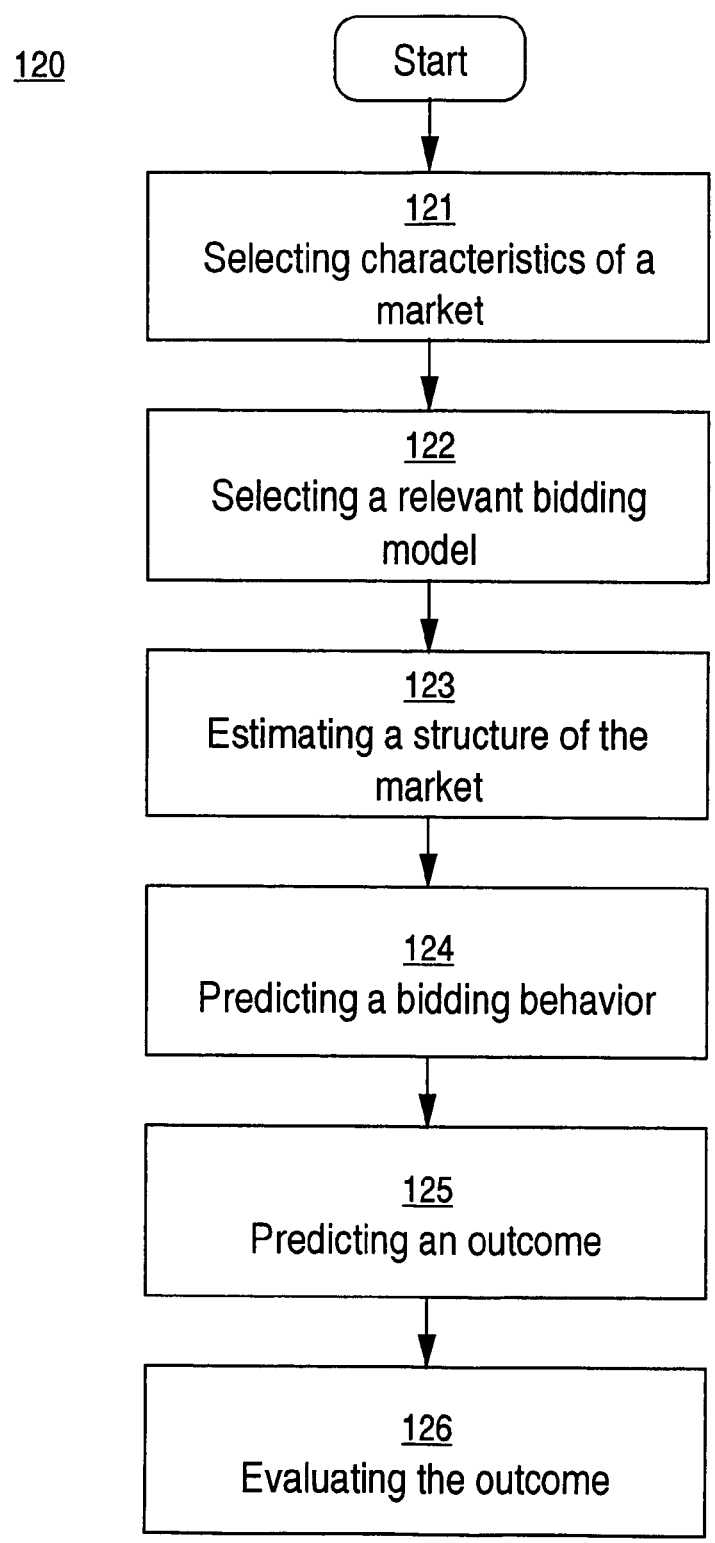
FIG. 12 is a flow chart of the steps in a process for determining an optimal auction format for a market, in accordance with one embodiment of the present invention.

FIG. 12 illustrates the steps in a process 120 for determining an auction format for a market, in accordance with one embodiment of the present invention. At step 121 of process 120, characteristics of the market are selected. Step 121 is described below in detail in process 40 of FIG. 4. At step 122, a relevant bidding model is selected. Step 122 is described below in detail in process 50 of FIG. 5. At step 123, a structure of said market is estimated. Step 123 is described below in detail in process 60 of FIG. 6. At step 124, a bidding behavior is predicted. Step 124 is described below in detail in process 70 of FIG. 7. At step 125, a first outcome of the market is predicted. Step 125 is described below in detail in process 80 of FIG. 8. At step 126, the first outcome of the market is evaluated. Step 126 is described below in detail in process 90 of FIG. 9.

Referring now to FIG. 4, the steps in a process 40 to effectuate a method of generating auction characteristics data are described, in accordance with one embodiment of the present invention. Reference is also made continually in the following discussion to elements depicted in FIGS. 1-3. Beginning with step 41, Data Selection Submodule 20 receives the user input of item(s) to be auctioned.

For each of the items specified by the user, in step 42, it then accesses the historical auction data repository 11 to extract data on auctions of similar items. The extracted records are formed into Bids Data that contain bids, bidder segment identifiers and auction mechanism characteristics.

Data Selection Submodule 20 passes the Bids Data, in step 43, to the Structure Estimation Submodule 22. Data Selection Submodule 20 passes the auction mechanism characteristics data and the bidder segment data to the Bidding Model Selection Submodule 21. Bidding Model Selection Submodule 21 computes the number of bidder segments and the number of bidders in each segment for each value of the mechanism characteristics data and retrieves the appropriate bidding model from the bidding model repository (e.g., repositories 11 or 12; FIG. 1).

As an example, suppose that historical auction data repository contains data on past auctions of the specified item. Suppose also that in all of the past auctions the bidders belong to one of two segments with five bidders in each segment 1 and three bidders in segment 2. Some of these auctions are run under English format, and some are run under a sealed-bid first-price format. In this example, Bidding Model Selection Module 21 retrieves two bidding models and passes to the Structure Estimation Submodule 22. These bidding models are:

MODEL 1: $\beta_j$ $(V, \{Format=English, Reserve\ Price=0\}, [2, (5, F_1, (a_1, b_1)), (3, F_2, (a_2, b_2))])$
$= V$ for all bidders $j$ and MODEL 2: $\beta_j$ $(V, \{Format=Sealed\ Bid\ First\ Price, Reserve\ Price=0, [2, (5, F_1, (a_1, b_1)), (3, F_2, (a_2, b_2))])=\phi_k(V)$ if $j$ is in segment $k$ ($k=1,2$)

where (($\phi_1(V), \phi_2(V)$) is the obtained from the solution to the differential equation system described above.

Structure Estimation Submodule 22 first inverts the received models to express the unobserved V in terms of observed bids. In the case of English and Vickrey auctions this inversion is trivial and the unobserved valuation of bidder j is equal to his bid: $v_j=b_j$.

In the case of sealed-bid first-price auctions this inversion is achieved as follows. The differential equation system (Eq. 1)-(Eq. 2) above is rewritten in the following equivalent form:

$$V_1 = b + [G_1(b)G_2(b)]/[(n_1-1)G_2(b)G_1'(b) + n_2 G_1(b)G_2'(b)] \quad (Eq.\ 3)$$

$$V_2 = b + [G_2(b)G_1(b)]/[(n_2-1)G_1(b)G_2'(b) + n_1 G_2(b)G_1'(b)] \quad (Eq.\ 4)$$

where $G_1$ (b) and $G_2$ (b) are the distributions of bids for a bidder in segment 1 and segment 2, respectively. The equations (Eq. 3)-(Eq. 4) express the unobserved valuations in terms observable bid distributions of bidders in the two segments.

Structure Estimation Submodule 22 performs the following steps to estimate the unknown structural elements $F_1$ (V) and $F_2$ (V):

Step 1:

Obtain estimates of $G_1$ (b), $G_2$ (b), $G_1'$ (b) and $G_2'$ (b) nonparametrically by employing any of a number of known statistical estimation methods. These methods include, but are not limited to, kernel methods and local polynomial estimation methods. Denote these estimates by $\hat{G}_1$ (b), $\hat{G}_2$ (b), $\hat{G}_1'$ (b), and $\hat{G}_2'$ (b). Let $\theta_1$ (b) denote the expression on the right hand side of Eq. 3 obtained by replacing the functions $G_1$ ( ), $G_2$ ( ), $G_1'$ ( ) and $G_2'$ ( ) by their estimates $\hat{G}_1$ ( ), $\hat{G}_2$ ( ), $\hat{G}_1'$ ( ), and $\hat{G}_2'$ ( ). Similarly, let $\theta_2$ (b) denote the expression on the right hand side of Eq. 4 obtained by the same process.

Step 2:

For each bidder j obtain an estimate of his valuation $v_j$ as follows:

If bidder j is in segment 1, $v_j=\theta_1$ ($b_j$) where $b_j$ is the bid submitted by bidder j.

If bidder j is in segment 2, $v_j=\theta_2$ ($b_j$) where $b_j$ is the bid submitted by bidder j.

Step 3:

Obtain estimates of the unknown structural elements $F_1$ (V) and $F_2$ (V) nonparametrically by employing any of a number of known statistical estimation methods. Let ($\hat{F}_1(V)$, $\hat{F}_2(V)$) denote these estimates. If the elements (($a_1$, $z_1$), ($a_2$, $z_2$)) are unknown, the valuation estimates constructed in step 2 above can also be used to get estimates of the elements (($a_1$, $z_1$), ($a_2$, $z_2$)) by using any of a number of well-known statistical procedures.

In step 44, Structure Estimation Submodule 22 outputs the estimated structure ($\hat{F}_1(V)$, $\hat{F}_2(V)$) to the Bidding Behavior Prediction Submodule 31 and Outcome Prediction Submodule 32 of the Auction Format Selector Module 14 and to the Report Generator Module 16, completing process 40.

Figure 5:
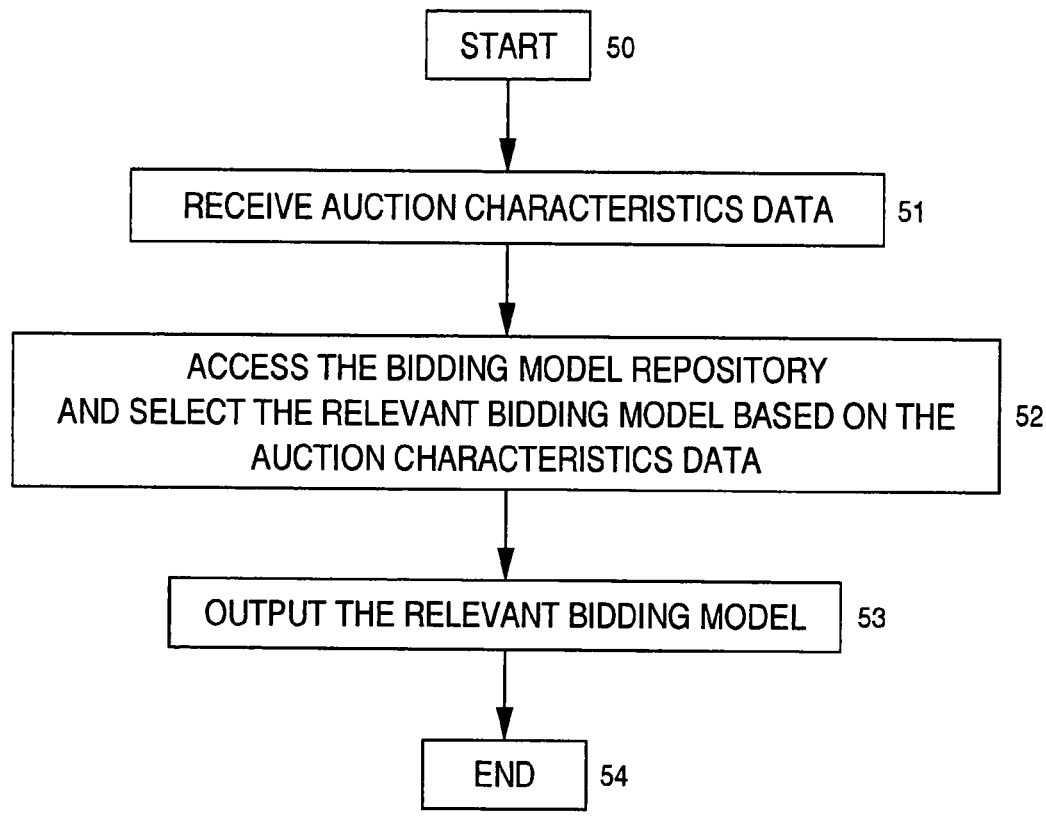
FIG. 5 is a flow chart of the steps in a process for generating a relevant bidding model, in accordance with one embodiment of the invention.

Referring now to FIG. 5, a process 50 effectuates the determination of a relevant bidding model, in accordance with one embodiment of the present invention. Reference is also made continually in the following discussion to elements depicted in FIGS. 1-3. At step 51, process 50 begins with Bidding Behavior Prediction Submodule 31 receiving auction mechanism characteristics and candidate auction formats as input.

At step 52, bidding behavior prediction module 31 passes this information to the Bidding Model Selection Submodule 21. Bidding Model Selection Submodule 21 retrieves the appropriate bidding model from the Bidding Model Repository 12. Bidding Behavior Prediction Submodule 31 also receives the estimated structure from the Structure Extractor Module 13. Predicted bidding behavior is obtained by substituting the estimated structure for the unknown elements in the retrieved bidding model.

At step 53, Structure Extractor Module 13 outputs the predicted bidding behavior to the Outcome Prediction Submodule 32, completing process 50.

Figure 6:
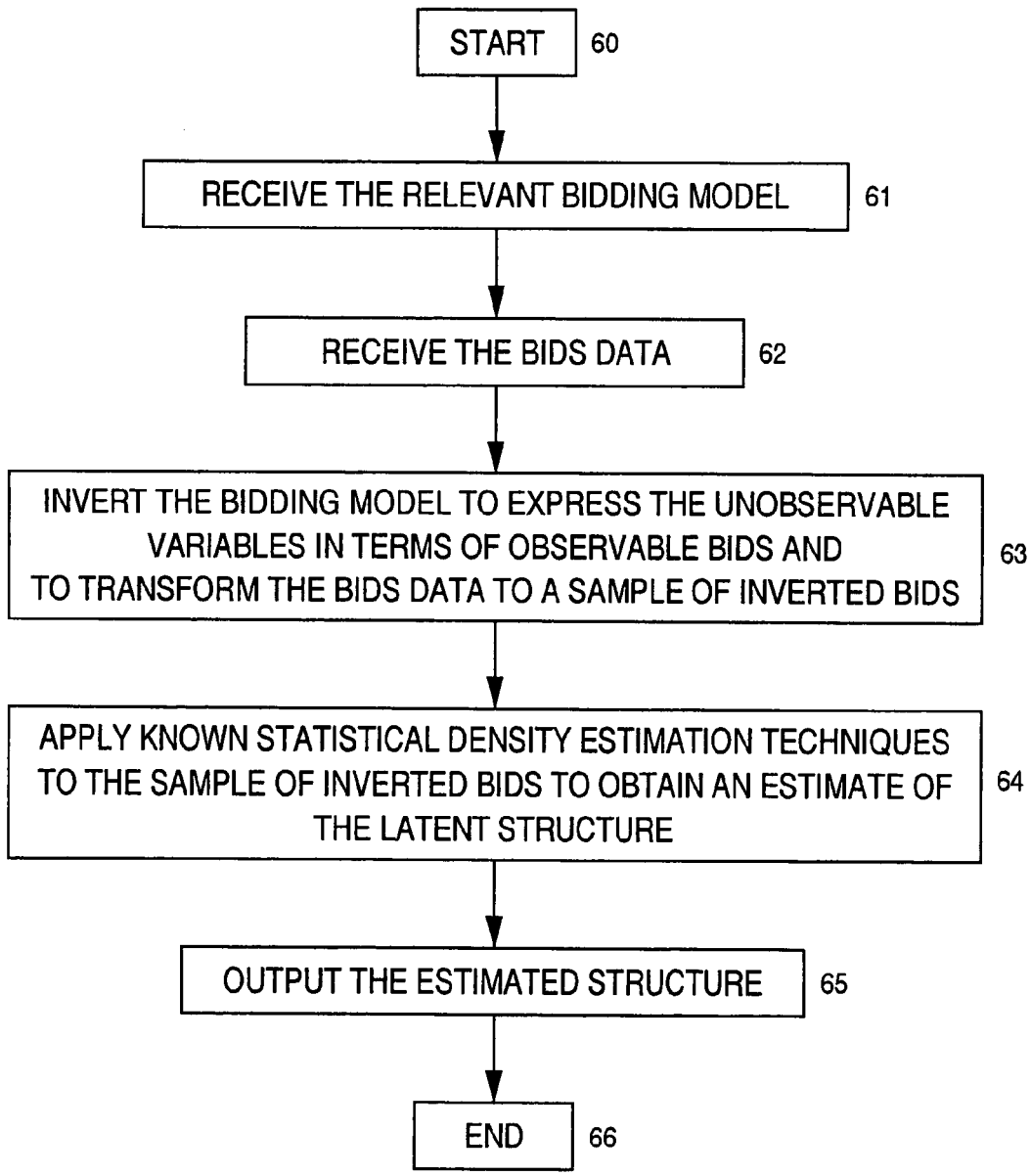
FIG. 6 is a flow chart of the steps in a process for generating an estimated market structure, in accordance with one embodiment of the invention.

The following is an exemplary application of a process 60, for determining an estimated market structure, in accordance with one embodiment of the present invention. With reference to FIG. 6 (as well as to FIGS. 1-3 for elements denoted therein), a user specifies that the auction mechanism to be used is a sealed-bid first-price auction with a reserve price of $300, and three bidders from segment 1 and four bidders from segment 2. The corresponding predicted bidding behavior, determined via process 50, is $\hat{\beta}_j$ $(V, \{Format=Sealed\ Bid\ First\ Price, Reserve\ Price=300, [2, (3, \hat{F}_1(V), (a_1, z_1)), (4, \hat{F}_2(V), (a_2, z_2))])=\phi_k(V)$ where $\phi_k(V)$ is obtained from the differential equation system described above with the initial condition $\phi_1$ (300)=$\phi_2$ (300) =300.

In step 61, the Outcome Prediction Submodule 32 receives the estimated structure ($\hat{F}_1(V)$, $\hat{F}_2(V)$) from the Structure Estimation Submodule 22. It also receives user inputs of (1) the seller's valuation of the item, $V_s$, representing the value the seller gets if the item is not sold in this auction, (2) a set of constraints on the auction parameters, (3) a set of candidate auction formats to be evaluated, and (4) a criterion for evaluating alternative auction format candidates; step 62.

It then passes each of the candidate auction formats, together with the auction parameters as well as the estimated structure ($\hat{F}_1(V)$, $\hat{F}_2(V)$) to the Bidding Behavior Prediction Submodule 31 and receives predicted bidding behavior $\hat{\beta}_j(V, \ldots)$ for each of the candidate auction format decisions. Outcome Prediction Submodule 32 then calculates the expected value of the evaluation criterion for each of the alternative auction formats by substituting the predicted bidder behavior and the estimated structural elements; step 63.

The Optimal Decision Submodule 34 receives the predicted outcome from the Outcome Prediction Submodule 32 and calculates the optimized expected value of the evaluation criterion for each of the candidate auction formats by selecting the values of the free parameters subject to the user-specified constraints; step 64. Optimum decision submodule 34 also calculates descriptive statistics (mean and variance) for the value of the evaluation criterion for each of the candidate auction formats and ranks the auction format alternatives.

The Report Generator Module 15 receives the estimated structure from the Structure Estimation Submodule 22 and the rankings and descriptive statistics of the predicted outcome for each of the auction format alternatives under consideration and presents this information in the form of a tabular and/or graphical report; step 65. Alternatively, the Optimal Decision Submodule 34 reports the configuration of the best auction format alternative to an external auction implementation system specified by the user so that the specified item can be auctioned under the optimal auction format.

Figure 7:
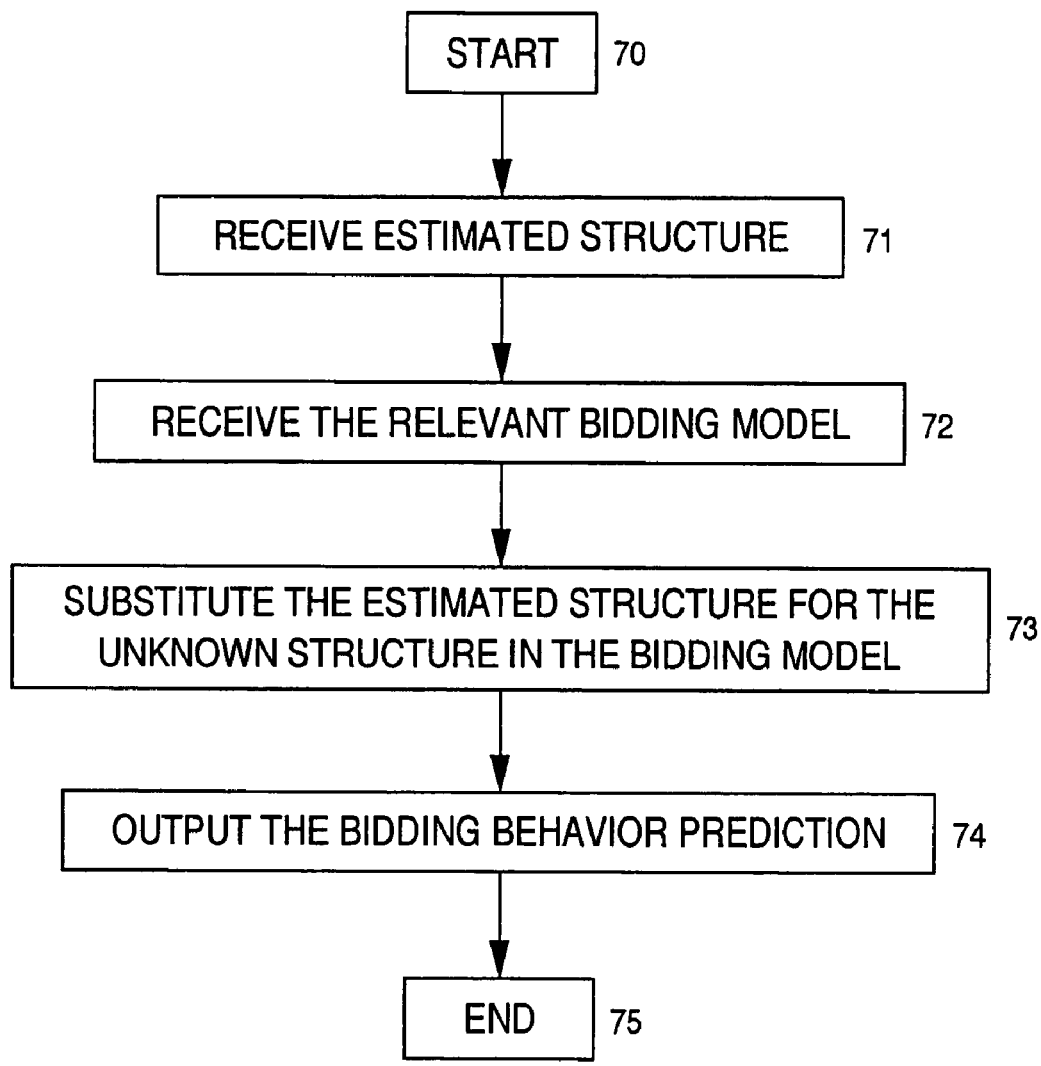
FIG. 7 is a flow chart of the steps in a process for predicting bidder behavior, in accordance with one embodiment of the invention.

Referring now to FIG. 7, the steps in a process 70 effectuate the prediction of bidding behavior, in accordance with one embodiment of the present invention. Beginning with step 71, the estimated market structure is received, as discussed above (process 60; FIG. 6).

At step 72, a relevant bidding structure is received, as discussed above (process 40; FIG. 4).

At step 73, the estimated structure is substituted for unknown structure in the bidding model, as discussed above (process 40; FIG. 4).

At step 74, bidding behavior is then predicted and outputted as discussed above (process 40; FIG. 4). This completes process 70.

Figure 8:
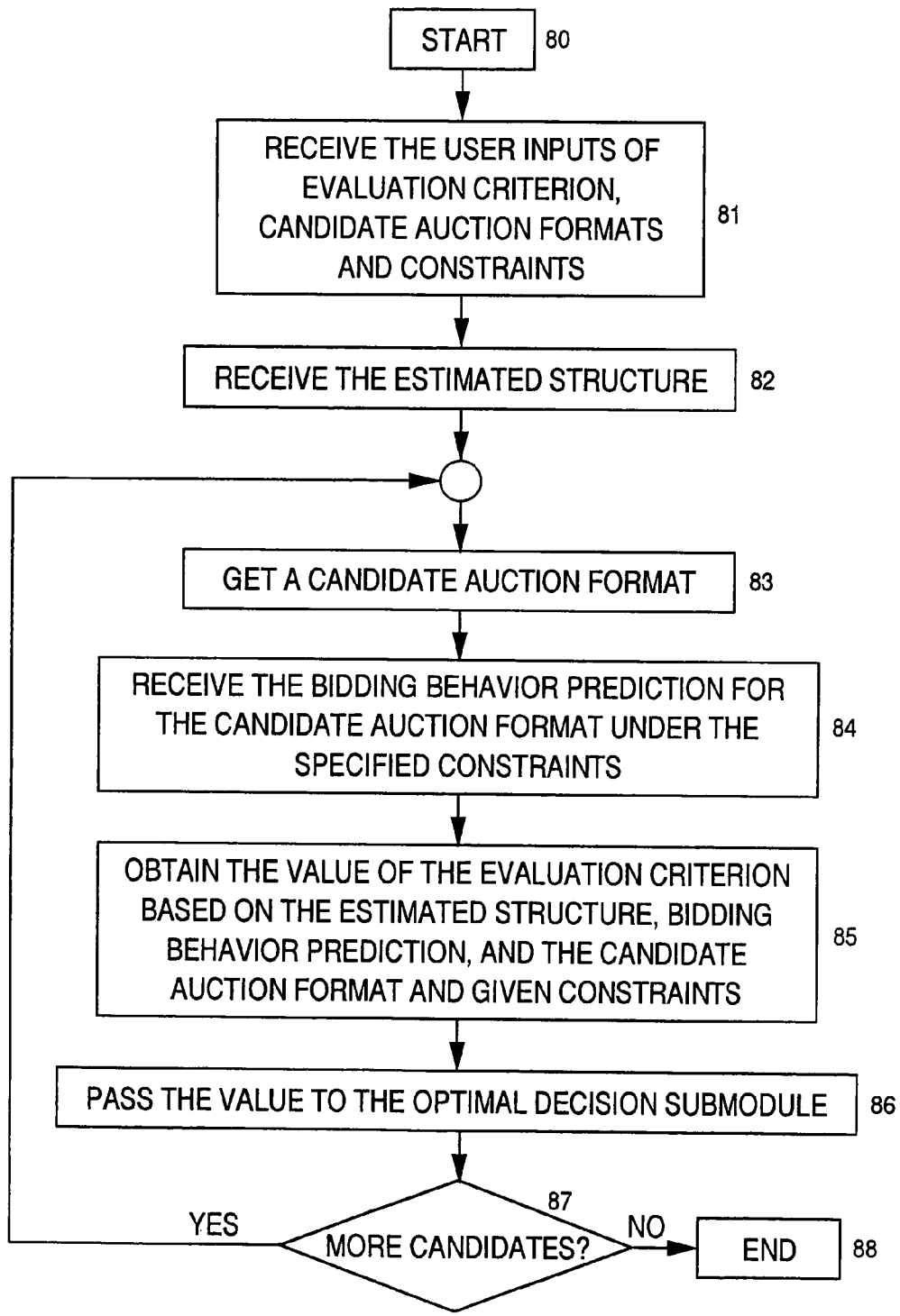
FIG. 8 is a flow chart of the steps in a process for determining an optimal auction format, in accordance with one embodiment of the invention.

With reference now to FIG. 8, the steps in a process 80 determine the optimal auction format for an auction, in accordance with one embodiment of the present invention. Beginning with step 81, user inputs are received for evaluation criteria, candidate auction formats, and constraints, as discussed above (process 60; FIG. 6).

At step 82, an estimated market structure is then received as discussed above (process 60; FIG. 6).

At step 83, a candidate auction format is selected; this is inputted for subsequent evaluation.

At step 84, a bidding behavior prediction is received, as discussed above (process 40; FIG. 4), for the candidate auction format under the specified constraints.

At step 85, the value of the evaluation criterion is obtained, which is based upon the estimated structure, the predicted bidding behavior, the selected candidate auction format, and the given constraints.

At step 86, the value of the evaluation criterion obtained is passed to the optimal decision submodule (Optimal Decision Submodule 34; FIG. 3).

At step 87, it is decided if more candidate auction formats are to be evaluated. If not, process 80 is complete at this point. If it is decided that another candidate auction format is to be evaluated, process 80, at this point, loops back to step 83 and continues repetitively.

Figure 9:
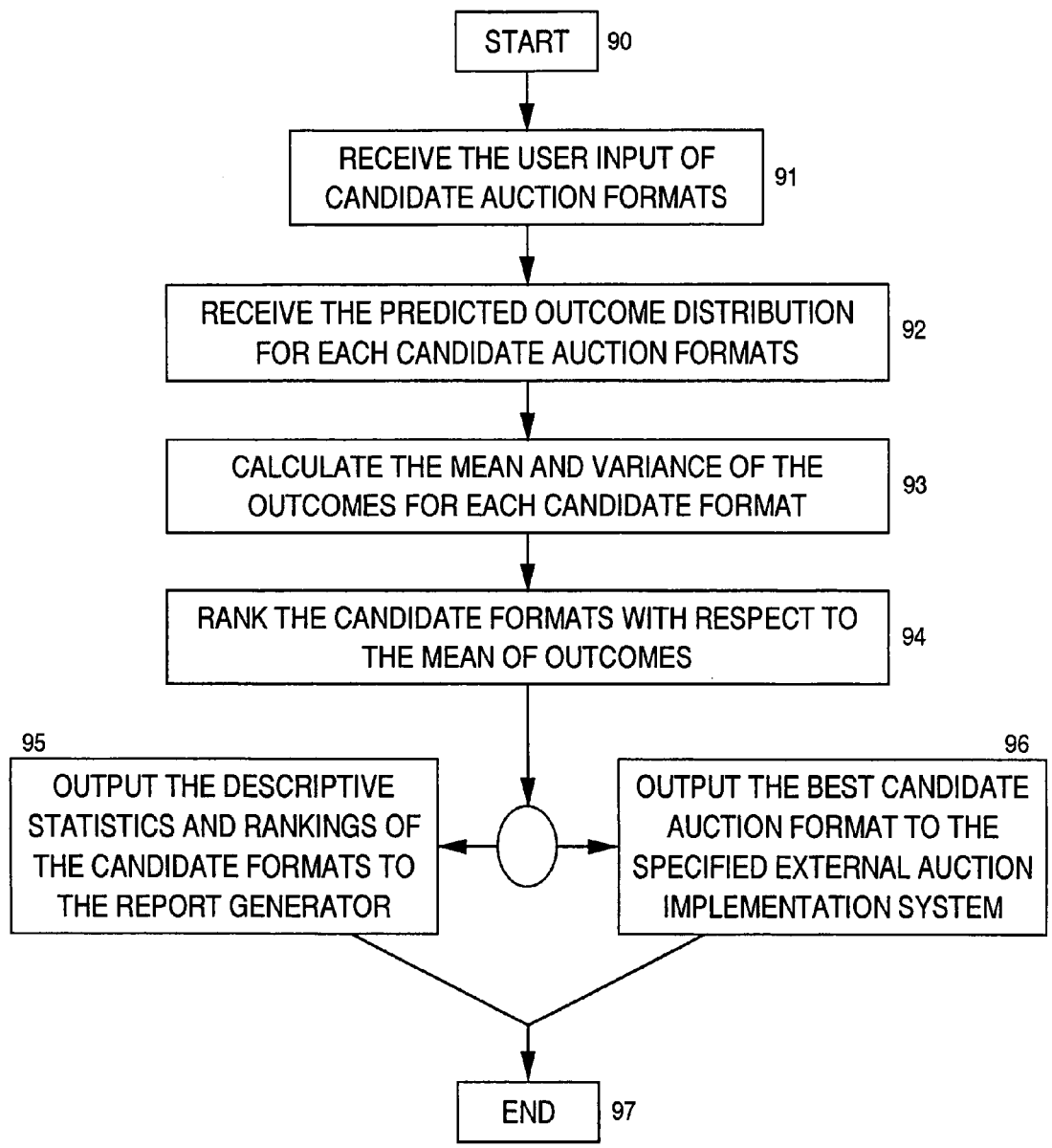
FIG. 9 is a flow chart of the steps in a process for reporting auction format ranking, in accordance with one embodiment of the invention.

With reference to FIG. 9, the steps in a process 90 effectuate the determination and reporting of optimal auction formats, in accordance with one embodiment of the present invention. The steps of process 90 may, in one embodiment, be performed as discussed above (processes 40-90; FIGS. 4-9, respectively).

Beginning with step 91, candidate auction formats are inputted by a user.

At step 92, for each candidate auction format received for evaluation, the predicted outcome distribution is received.

At step 93, the mean and variance of the outcomes for each candidate auction formats are calculated.

At step 94, the candidate auction formats are ranked, with respect to the mean of outcomes.

At step 95, the descriptive statistics and rankings of the candidate outcomes are outputted to the report generator.

At step 96, the best candidate auction format (e.g., the optimal auction format determined by one embodiment of the present invention) is outputted to a specified auction implementation system. In one embodiment, steps 95 and 96 may be performed substantially simultaneously. In one embodiment, either step 95 or 96 may be performed without the other step. At this point, process 90 is complete.

Exemplary System Platform

Exemplary Computer System

Figure 10:
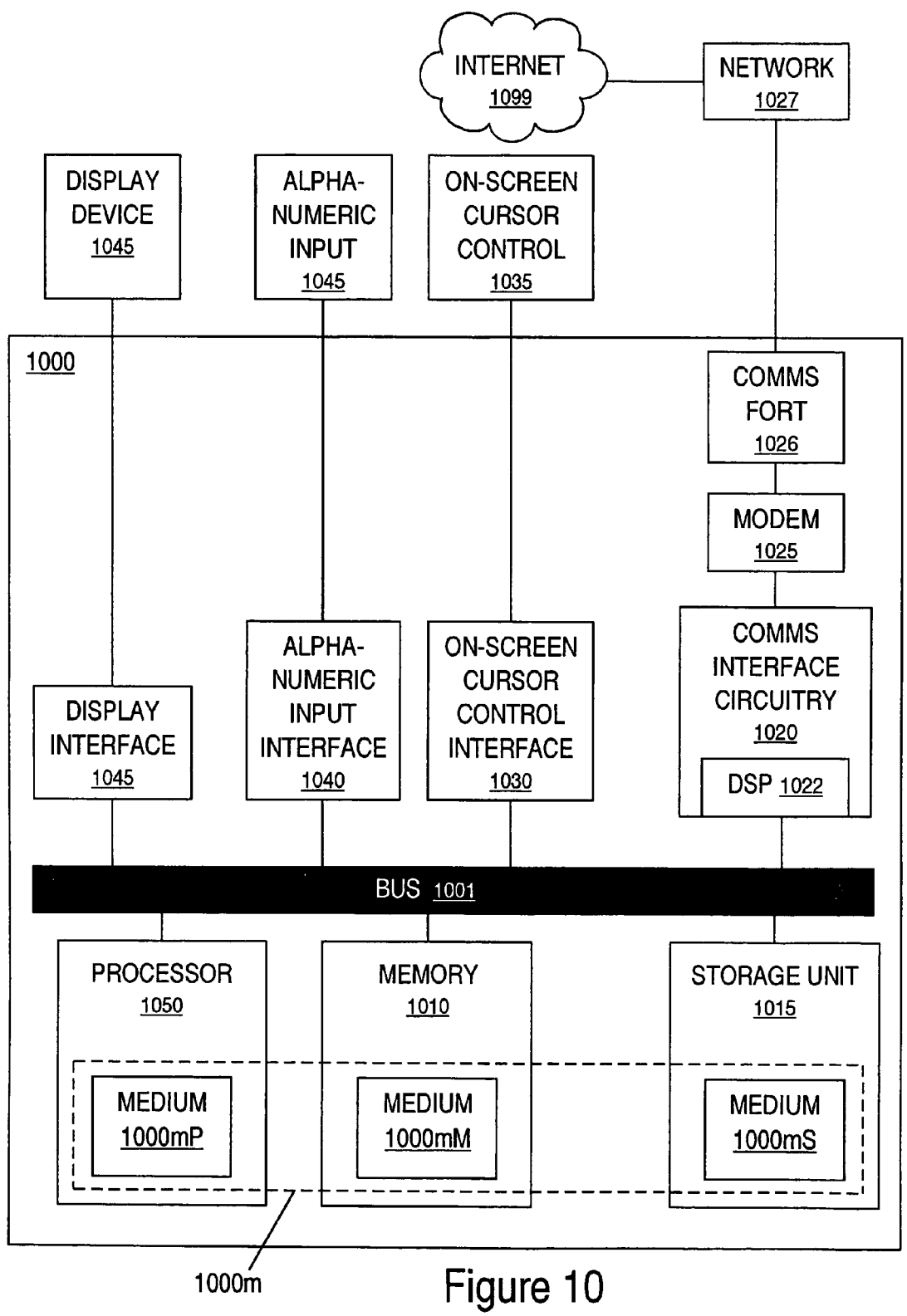
FIG. 10 is a block diagram depicting a computer system and computer readable media for implementing processes of optimal auction format determination, in accordance with one embodiment of the invention.

FIG. 10 is a block diagram depicting a computer system 1000 and a computer readable media 1000m for implementing processes of optimal auction format determination, in accordance with one embodiment of the invention.

With reference to FIG. 10, computer system 1000 includes a bus 1001 for communicating information, a central processor 1050 coupled with the bus 1001 for processing information and instructions, and a memory unit 1010 (e.g., random access memory and/or read only memory) and a data storage system 1015 coupled with the bus 1001 for storing information and instructions. Data storage system 1015 may be any magnetic and/or optical disc and drive/reader, or any other data storage device.

In one embodiment of the present invention, the processes described, including but not limited to determination of optimal auction format (e.g., Process 800, FIG. 8), may be executed by processor 1050, which may be an application specific integrated circuit (ASIC). Alternatively, these methods may be implemented by processor 1050 executing a program stored in memory 1010 and/or data storage system 1015. It is appreciated that computer system 1000 may implement the invention by combinations of these schemes, or by alternatives other than those pictured. It is also appreciated that computer system 1000 can include other elements not shown. It is further appreciated that computer system 1000 may be constituted by any functional equivalent, or by any viable alternative architecture.

In the present embodiment, computer system 1000 includes a communications device 1025. Communications device 1025 may be a modulator/demodulator (MODEM). Communications device 1025 enables communication via a communications port 1026.

In the present embodiment, computer system 1000 may be communicatively coupled with an external network 1027, via communications port 1026. External network 1027 may be a local area network (LAN), or any other feasible network configuration, and may include other networks including wide area networks (WAN) and the Internet 1099.

Computer system 1000 executes, in one implementation, a program embodied in a computer readable medium 1000m which may be deployed in and/or to various degrees between processor 1050 (e.g., as 1000mP), memory 1010 (e.g., as 1000mM), and storage unit 1015 (e.g., as 1000mS). In the present implementation, execution of this program by computer system 1000 enables a process, which implements a method for analyzing new auction formats, outcomes, and rules, from limited and partially observable bidder characteristics and by utilizing any known results on some aspects of the new auction rules.

In one embodiment, bidder characteristics, auction outcomes and formats, and accompanying rules may be archived in, written to, retrieved from, and modified within a database (e.g., repositories 11 and 12; FIGS. 1 and 11). In one embodiment, the database may be deployed within computer readable medium 1000*m*.

In the present embodiment, system 1000 also optionally contains a display interface 1045 coupled to the bus 1001 for enabling incorporation of a display device 1046. Display device 1046 enables displaying information to users. In one embodiment, display interface 1045 may be a graphical user interface (GUI). In one embodiment, display interface 105 enables an auction input interface. In one embodiment, aspects of display interface 1045 may be deployed within computer readable medium 1000*m*.

System 1000 may include an alphanumeric input interface 1040 coupled to the bus 1001 for enabling incorporation of an alphanumeric input device 1041. Alphanumeric input device 1041 can communicate information and command selections to processor 1050 via alphanumeric input interface 1040 and bus 1001.

System 1000 also includes an optional cursor control or directing device (on-screen cursor control 1036) coupled to bus 1001 via on-screen cursor control interface 1030, for communicating user input information and command selections to processor 1050. In one implementation, on-screen cursor control 1036 is a mouse, trackball, joystick or special keys on alphanumeric input device 1041 capable of signaling movement of a given direction or manner of displacement.

Input interface 1040 and cursor control 1036 may both function, individually or in concert, as enabling mechanisms of a auction input.

In one embodiment, computer system 1000 may be a PC, a desktop, a laptop, or another implementation such as a mainframe or supercomputer. In another embodiment, computer system 1000 may be another computer platform, including, but not limited to PC type platforms, Macintosh, UNIX, servers, and workstations of various types. In yet another embodiment, computer system 1000 may be a portable computer platform, such as a PDA, palmtop computer, or the like. In another embodiment, system 1000 may be any other intelligent electronic system capable of implementing computer functions, such as cellular telephones, two-way pagers, other pagers, other data and communication systems, and other information processing platforms with auction capabilities.

Exemplary Database

FIGS. 11*a-g* depict the contents of an exemplary database of market data, in accordance with one embodiment of the invention. The exemplary database herein contains information about past auctions and market participants. In one embodiment of the present invention, the following variables are observed for each auction in the database, as shown in FIGS. 11*a-g*. Auction data includes the auction identification and other characteristics thereof. Information about the auctioned item includes its identity, its name, quantity, description, and other attributes. The market mechanism contains data about the auction format, reserve price, preference policy, and other mechanism attributes. Bidders are identified by bidder and segment identity and other attributes. Bids are categorized y the identities of participating bidders and the bids submitted by them. Outcomes listed include assigned payments and quantities for each bidder. These are detailed in FIGS. 11*a-g*.

In summary, the present invention provides an automated estimation and optimization solution for selecting the best auction format. An embodiment of the present invention provides a method and system that provides automated decision support for selecting the best auction format based on structural analysis of data from related auctions. An embodiment of the present invention provides a method and system that determines the latent elements of the auction environment taking into account the strategic and information conditions with minimal assumptions on the distributions of unobserved random elements. An embodiment of the present invention provides a method and system that enables (1) a buyer conducting an auction to procure an item(s), or (2) a seller conducting an auction to sell an item(s) to identify and estimate empirically the unknown elements of the market structure and to factor this information into his decisions regarding the appropriate format to implement in the auction to be conducted. In one embodiment of the present invention, structural analysis of bid data from prior auctions is used to identify and estimate the distributions of bidders' private signals conditional on observable bidder characteristics. In one embodiment, the estimated signal distributions, identified by the structural analysis, are used to evaluate alternative auction formats and to select the best format from among a given set of candidates. In one embodiment, the present invention provides decision support tools to select an auction format based on structural econometric analysis of available data on the market environment. The present invention allows a decision-maker to estimate the unobservable private signals of the bidders and to determine the best auction format the decision maker can employ to sell a given set of items.

A preferred embodiment of the present invention, a method and system for selecting an optimal auction format, is thus described. While the present invention has been described in particular embodiments, it should be appreciated that the present invention should not be construed as limited by such embodiments, but rather construed according to the below claims.

What is claimed is:

1. A method for determining an auction format for a market, said method comprising the steps of:

selecting, performed by a computer system, characteristics of said market based at least in part on stored historical bids data that includes data for historical auctions performed in the past for a plurality of bidders, wherein said historical bids data is stored on computer readable medium that is accessed by said computer system;

selecting, performed by said computer system, a relevant bidding model that specifies past bidding behavior as a function of information held privately by a bidder, that is determined based at least in part on said historical auctions data, and said characteristics of said market based on segments of said historical auctions related to a specified item;

selecting, performed by said computer system, at least a first estimated structure of said market, which describes at least a first factor that affects how bidders behave, and a second estimated structure of said market, which describes a second factor that affects how bidders behave, at least in part by inverting said relevant bidding model;

predicting, performed by said computer system, a first bidding behavior utilizing said first estimated structure of said market, said characteristics of said market and said relevant bidding model;

predicting, performed by said computer system, a first outcome of said market based on said first bidding behavior;

predicting, performed by said computer system, at least a second bidding behavior utilizing at least said second estimated structure of said market, said characteristics of said market and said relevant bidding model;

predicting, performed by said computer system, a second outcome of said market based on at least said second bidding behavior prediction; and determining, performed by said computer system, said auction format for said market by evaluating said first outcome of said market and at least said second outcome of said market.

2. The method as recited in claim 1, wherein said selecting of said characteristics of said market step comprises the steps of:

receiving a first user input, wherein said first user input comprises information identifying an item to be auctioned;

accessing a database;

retrieving said historical bids data from said database;

retrieving from said database auction characteristics data, wherein said auction characteristics data comprise information relating to historical auctions of similar items;

outputting said historical bids data; and outputting said auction characteristics data.

3. The method as recited in claim 1, wherein said selecting of said relevant bidding model step comprises the steps of:

receiving auction characteristics data;

accessing a database;

retrieving from said database said relevant bidding model, wherein said relevant bidding model is selected based on a corresponding relevance of said auction characteristics data; and outputting said relevant bidding model.

4. The method as recited in claim 1, wherein said selecting of said first estimated structure of said market step comprises the steps of:

receiving said relevant bidding model;

receiving said historical bids data;

expressing unobservable variables in terms of observable bids, wherein said unobservable variables are expressed in terms of said observable bids by inverting said relevant bidding model;

transforming said historical bids data to a sample of inverted bids, wherein said historical bids data are transformed by inverting said relevant bidding model;

estimating an estimated latent structure of said market, wherein said sample of inverted bids receives application of statistical density estimation techniques to obtain said estimated latent structure of said market; and outputting said estimated latent structure of said market.

5. The method as recited in claim 1, wherein said relevant bidding model has embedded an unknown structure, and wherein said predicting of said first bidding behavior step comprises the steps of:

receiving said estimated structure of said market;

receiving said relevant bidding model;

substituting said unknown structure with said estimated structure of said market; and outputting a prediction of bidding behavior.

6. The method as recited in claim 1, wherein said predicting of said first outcome of said market step comprises the steps of:

receiving a second user input, wherein said second user input comprises:

an evaluation criterion;
a candidate auction format; and
a constraint;

receiving said first estimated structure of said market;

receiving said first bidding behavior prediction for said candidate auction format, wherein said first bidding behavior prediction further comprises a prediction under said constraint;

obtaining a value of said evaluation criterion, wherein said value is based on said first estimated structure of said market, said first bidding behavior prediction, said candidate auction format, and said constraint, wherein said value comprising said first outcome of said market; and outputting said value.

7. The method as recited in claim 1, wherein said evaluating of said first outcome and at least said second outcome of said market of said market step comprises the steps of:

receiving a third user input, wherein said third user input comprises a plurality of candidate auction formats;

receiving a predicted outcome for each of said candidate auction formats;

calculating descriptive statistics for each of said candidate auction formats, wherein said descriptive statistics comprise a mean and a variance;

ranking each of said candidate auction formats with respect to said calculated mean and generating corresponding rankings for said plurality of candidate auction formats; and outputting said descriptive statistics and said rankings.

8. The method as recited in claim 7, wherein said evaluating said first outcome of said market and at least said second outcome of said market step further comprises the steps of:

selecting a best auction format, wherein said best auction format comprises the candidate auction format within said plurality of candidate auction formats having the highest of said rankings; and outputting said best auction format.

9. A computer system comprising:

a processor for executing instructions;

a computer readable medium with said instructions stored thereon, wherein said instructions implement;

a market-characteristic-based-on-historical-auctions-selector configured for selecting characteristics of said market based at least in part on stored historical bids data that includes data for historical auctions performed in the past for a plurality of bidders;

a relevant-bidding-model-selector-based-on-privately-held-bidder-information-and-based-on-segments-of-past-auctions configured for selecting a relevant bidding model that specifies past bidding behavior as a function of information held privately by a bidder, that is determined based at least in part on said past auctions data, and said characteristics of said market based on segments of said past auctions related to a specified item;

an estimated-structure-of-market-selector configured for selecting at least a first and a second estimated structure of said market, wherein said first estimated structure of said market describes at least a first factor that affects how bidders behave and wherein said second estimated structure of said market describes at least a second factor that affects how bidders behave;

a bidding-behavior-based-on-estimated-market-structure-predictor configured for predicting a first bidding behavior utilizing said first estimated structure of said market, said characteristics of said market and said relevant bidding model;

a market-outcome-based-on-bidding-behavior-predictor configured for predicting a first outcome of said market based on said first bidding behavior;

said bidding-behavior-based-on-estimated-market-structure-predictor configured for predicting at least a second bidding behavior utilizing at least said second estimated structure of said market, said characteristics of said market and said relevant bidding model;

said market-outcome-based-on-bidding-behavior-predictor configured for predicting a second outcome of said market based on at least said second bidding behavior prediction; and a determiner-of-auction-format-based-on-evaluating-market-outcome configured for determining an auction format by evaluating said first outcome of said market and at least said second outcome of said market.

10. The system as recited in claim 9, wherein said market-characteristic-based-on-historical-auctions-selector is further configured for:

receiving a first user input, wherein said first user input comprises information identifying an item to be auctioned;

accessing a database;

retrieving from said database said historical bids data;

retrieving from said database auction characteristics data, wherein said auction characteristics data comprise information relating to historical auctions of similar items;

outputting said historical bids data; and outputting said auction characteristics data.

11. The system as recited in claim 9, wherein said relevant-bidding-model-selector-based-on-privately-held-bidder-information-and-based-on-segments-of-past-auctions is further configured for:

receiving auction characteristics data;

accessing a database;

retrieving from said database said relevant bidding model, wherein said relevant bidding model is selected based on a corresponding relevance of said auction characteristics data; and outputting said relevant bidding model.

12. The system as recited in claim 9, wherein said estimated-structure-of-market-selector is further configured for:

receiving said relevant bidding model;

receiving said historical bids data;

expressing unobservable variables in terms of observable bids, wherein said unobservable variables are expressed in terms of said observable bids by inverting said relevant bidding model;

transforming said historical bids data to a sample of inverted bids, wherein said historical bids data are transformed by inverting said relevant bidding model;

estimating an estimated latent structure of said market, wherein said sample of inverted bids receives application of statistical density estimation techniques to obtain said estimated latent structure of said market; and outputting said estimated latent structure of said market.

13. The system as recited in claim 9, wherein said bidding model has embedded an unknown structure, and wherein said bidding-behavior-based-on-estimated-market-structure-predictor is further configured for:

receiving said estimated structure of said market;

receiving said relevant bidding model;

substituting said unknown structure with said estimated structure of said market; and outputting a prediction of bidding behavior.

14. The system as recited in claim 9, wherein said market-outcome-based-on-bidding-behavior-predictor is further configured for:

receiving a second user input, wherein said second user input comprises:
an evaluation criterion;
a candidate auction format; and
a constraint;

receiving said first estimated structure of said market;

receiving said first bidding behavior prediction for said candidate auction format, wherein said first bidding behavior prediction further comprises a prediction under said constraint;

obtaining a value of said evaluation criterion, wherein said value is based on said first estimated structure of said market, said first bidding behavior prediction, said candidate auction format, and said constraint, wherein said value comprising said first outcome of said market; and outputting said value.

15. The system as recited in claim 9, wherein said determiner-of-auction-format-based-on-evaluating-market-outcome is further configured for:

receiving a third user input, wherein said third user input comprises a plurality of candidate auction formats;

receiving a predicted outcome for each of said candidate auction formats;

calculating descriptive statistics for each of said candidate auction formats, wherein said descriptive statistics comprise a mean and a variance;

ranking each of said candidate auction formats with respect to said calculated mean and generating corresponding rankings for said plurality of candidate auction formats; and outputting said descriptive statistics and said rankings.

16. The system as recited in claim 15, wherein said determiner-of-auction-format-based-on-evaluating-market-outcome is further configured for:

selecting a best auction format, wherein said best auction format comprises the candidate auction format within said plurality of candidate auction formats having the highest of said rankings; and outputting said best auction format.

17. A computer readable medium having stored thereon computer-executable instructions for causing a computer system to execute the steps in a method for determining an auction format for a market, said method comprising the steps of:

selecting characteristics of said market based at least in part on stored historical bids data that includes data for historical auctions performed in the past for a plurality of bidders;

selecting a relevant bidding model that specifies past bidding behavior as a function of information held privately by a bidder, that is determined based at least in part on said historical auctions data, and said characteristics of said market based on segments of said historical auctions related to a specified item;

selecting at least a first estimated structure of said market, which describes at least a first factor that affects how bidders behave, and a second estimated structure of said market, which describes a second factor that affects how bidders behave, at least in part by inverting said relevant bidding model;

predicting a first bidding behavior utilizing said first estimated structure of said market, said characteristics of said market and said relevant bidding model;

predicting a first outcome of said market based on said first bidding behavior;

predicting at least a second bidding behavior utilizing at least said second estimated structure of said market, said characteristics of said market and said relevant bidding model;

predicting a second outcome of said market based on at least said second bidding behavior prediction; and determining said auction format for said market by evaluating said first outcome of said market and at least said second outcome of said market.

18. The computer readable medium as recited in claim 17, wherein said selecting of said characteristics of said market step comprises the steps of:

receiving a first user input, wherein said first user input comprises information identifying an item to be auctioned;

accessing a database;

retrieving from said database said historical bids data;

retrieving from said database auction characteristics data, wherein said auction characteristics data comprise information relating to historical auctions of similar items;

outputting said historical bids data; and outputting said auction characteristics data.

19. The computer readable medium as recited in claim 17, wherein said selecting of said relevant bidding model step comprises the steps of:

receiving auction characteristics data;

accessing a database;

retrieving from said database said relevant bidding model, wherein said relevant bidding model is selected based on a corresponding relevance of said auction characteristics data; and outputting said relevant bidding model.

20. The computer readable medium as recited in claim 17, wherein said selecting of said first estimated structure of said market step comprises the steps of:

receiving said relevant bidding model;

receiving said historical bids data;

expressing unobservable variables in terms of observable bids, wherein said unobservable variables are expressed in terms of said observable bids by inverting said relevant bidding model;

transforming said historical bids data to a sample of inverted bids, wherein said historical bids data are transformed by inverting said relevant bidding model;

estimating an estimated latent structure of said market, wherein said sample of inverted bids receives application of statistical density estimation techniques to obtain said estimated latent structure of said market; and outputting said estimated latent structure of said market.

21. The computer readable medium as recited in claim 17, wherein said relevant bidding model has embedded an unknown structure, and wherein said predicting of said first bidding behavior step comprises the steps of:

receiving said estimated structure of said market;

receiving said relevant bidding model;

substituting said unknown structure with said estimated structure of said market; and outputting a prediction of bidding behavior.

22. The computer readable medium as recited in claim 17, wherein said predicting of said first outcome of said market step comprises the steps of:

receiving a second user input, wherein said second user input comprises:

an evaluation criterion;

a candidate auction format; and a constraint;

receiving said first estimated structure of said market;

receiving said first bidding behavior prediction for said candidate auction format, wherein said first bidding behavior prediction further comprises a prediction under said constraint;

obtaining a value of said evaluation criterion, wherein said value is based on said first estimated structure of said market, said first bidding behavior prediction, said candidate auction format, and said constraint, wherein said value comprising said first outcome of said market; and outputting said value.

23. The computer readable medium as recited in claim 17, wherein said evaluating of said first outcome and at least said second outcome of said market of said market step comprises the steps of:

receiving a third user input, wherein said third user input comprises a plurality of candidate auction formats;

receiving a predicted outcome for each of said candidate auction formats;

calculating descriptive statistics for each of said candidate auction formats, wherein said descriptive statistics comprise a mean and a variance;

ranking each of said candidate auction formats with respect to said calculated mean and generating corresponding rankings for said plurality of candidate auction formats; and outputting said descriptive statistics and said rankings.

24. The computer readable medium as recited in claim 23, wherein said evaluating of said first outcome of said market and at least said second outcome of said market step further comprises the steps of:

selecting a best auction format, wherein said best auction format comprises the candidate auction format within said plurality of candidate auction formats having the highest of said rankings; and outputting said best auction format.

* * * * *

UNITED STATES PATENT AND TRADEMARK OFFICE
CERTIFICATE OF CORRECTION

PATENT NO. : 7,627,514 B2  Page 1 of 1
APPLICATION NO. : 09/903075
DATED : December 1, 2009
INVENTOR(S) : Kemal Guler et al.

It is certified that error appears in the above-identified patent and that said Letters Patent is hereby corrected as shown below:

On the Title Page, in field (75), in column 1, Inventors, line 2,
delete "Redwood City, CA" and insert -- Brooklyn, NY --, therefor.

In column 20, lines 16-17, in Claim 7, delete "of said market of said market" and
insert -- of said market --, therefor.

In column 20, line 42, in Claim 9, delete "implement;" and
insert -- implement: --, therefor.

In column 24, line 29, in Claim 23, delete "of said market of said market" and
insert -- of said market --, therefor.

Signed and Sealed this

First Day of June, 2010

David J. Kappos
*Director of the United States Patent and Trademark Office*